US010306407B2

(12) United States Patent
Soro et al.

(10) Patent No.: US 10,306,407 B2
(45) Date of Patent: May 28, 2019

(54) AUTOMATIC FREQUENCY BAND SELECTION USING INFRASTRUCTURE-ENABLED BEACONING

(71) Applicant: General Electric Company, Schenectady, NY (US)

(72) Inventors: Stanislava Soro, Niskayuna, NY (US); Steven William Wik, Niskayuna, NY (US); S. M. Shajedul Hasan, Niskayuna, NY (US); Danijel Maricic, Niskayuna, NY (US); David M. Davenport, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/634,393

(22) Filed: Jun. 27, 2017

(65) Prior Publication Data
US 2018/0376284 A1 Dec. 27, 2018

(51) Int. Cl.
*H04W 4/02* (2018.01)
*H04W 4/80* (2018.01)
*H04W 72/04* (2009.01)

(52) U.S. Cl.
CPC ............. *H04W 4/023* (2013.01); *H04W 4/80* (2018.02); *H04W 72/0453* (2013.01)

(58) Field of Classification Search
CPC .... H04W 4/023; H04W 4/80; H04W 72/0453
See application file for complete search history.

(56) References Cited

U.S. PATENT DOCUMENTS

| 9,386,669 | B2* | 7/2016 | Karc | H05B 37/0272 |
|---|---|---|---|---|
| 9,609,521 | B2* | 3/2017 | Wang | H04W 16/14 |
| 9,644,973 | B2* | 5/2017 | James | G01C 21/206 |
| 2006/0268677 | A1* | 11/2006 | Suh | H04L 27/2628 370/210 |
| 2007/0032246 | A1* | 2/2007 | Feher | H04W 64/00 455/456.1 |
| 2007/0239229 | A1* | 10/2007 | Masoud | A61B 5/0024 607/60 |
| 2008/0228045 | A1 | 9/2008 | Gao et al. | |
| 2009/0149208 | A1* | 6/2009 | Huttunen | H04W 24/10 455/509 |
| 2010/0210213 | A1* | 8/2010 | Pawar | H04L 5/0044 455/62 |
| 2011/0080281 | A1* | 4/2011 | Neebe | B07C 3/12 340/539.1 |
| 2011/0149759 | A1 | 6/2011 | Jollota | |
| 2011/0152970 | A1* | 6/2011 | Jollota | H04W 4/70 607/60 |

(Continued)

*Primary Examiner* — Dominic E Rego
(74) *Attorney, Agent, or Firm* — Hanley, Flight and Zimmerman, LLC

(57) ABSTRACT

Apparatus, systems and articles of manufacture to provide improved, automatic, and dynamic frequency selection for and/or by medical body area network apparatus are disclosed. Certain examples provide a medical body area network apparatus. The example apparatus includes a radio to receive a beacon signal and a processor to process the beacon signal to determine a location of the apparatus. The example processor is configured to at least: when the beacon signal indicates a first location, communicate via a first frequency band; and when the beacon signal indicates a second location, communicate via a second frequency band.

17 Claims, 14 Drawing Sheets

(56) References Cited

U.S. PATENT DOCUMENTS

| | | | |
|---|---|---|---|
| 2012/0053757 A1* | 3/2012 | Breshears | G01S 5/0081 |
| | | | 701/2 |
| 2012/0163263 A1* | 6/2012 | Oh | H04W 52/0216 |
| | | | 370/311 |
| 2012/0242501 A1* | 9/2012 | Tran | A61B 5/0024 |
| | | | 340/870.02 |
| 2013/0017791 A1* | 1/2013 | Wang | H04W 16/14 |
| | | | 455/41.2 |
| 2013/0023215 A1 | 1/2013 | Wang | |
| 2013/0245387 A1 | 9/2013 | Patel | |
| 2013/0268028 A1* | 10/2013 | Trier | A61N 1/37229 |
| | | | 607/60 |
| 2013/0337842 A1* | 12/2013 | Wang | A61B 5/0024 |
| | | | 455/456.4 |
| 2014/0036863 A1 | 2/2014 | Lim et al. | |
| 2014/0148100 A1 | 5/2014 | Kim et al. | |
| 2015/0238082 A1 | 8/2015 | Soro et al. | |
| 2016/0013872 A1 | 1/2016 | Astrand et al. | |
| 2016/0066788 A1 | 3/2016 | Tran et al. | |
| 2016/0135206 A1 | 5/2016 | Wang | |
| 2016/0135685 A1 | 5/2016 | Cao | |
| 2016/0267260 A1* | 9/2016 | Jiang | H04L 63/104 |
| 2016/0301259 A1* | 10/2016 | Zeine | H02J 50/80 |
| 2016/0356149 A1* | 12/2016 | Cole | E21B 7/046 |
| 2017/0013409 A1* | 1/2017 | Cerchio | G01C 25/005 |
| 2017/0019769 A1* | 1/2017 | Li | G01S 1/08 |
| 2017/0111824 A1 | 4/2017 | Wang | |
| 2017/0133750 A1* | 5/2017 | Cordone | H01Q 1/27 |
| 2017/0170924 A1* | 6/2017 | Soro | H04L 1/0002 |
| 2018/0038940 A1* | 2/2018 | Want | G01S 5/10 |

\* cited by examiner

AUTOMATIC FREQUENCY BAND SELECTION USING INFRASTRUCTURE-ENABLED BEACONING

FIELD OF THE DISCLOSURE

This disclosure relates generally to medical body area network, and, more particularly, to automatic frequency band selection for medical body area networks using infrastructure-enabled beacons.

BACKGROUND

Real-time location systems (RTLS) monitor asset distribution and usage, providing actionable information to help control costs and improve the quality and efficiency of care. Systems that have been developed to track and analyze activities in clinical settings have included installing Radio Frequency Identification (RFID) or infrared (IR) reader infrastructures into buildings to capture position information. RFID sensors may be placed on the people and/or assets that need to be tracked.

However, this is an expensive and time-consuming solution because it requires pulling power and data cabling to all the required locations. Location accuracy can also vary depending on technology. Typical RFID systems have a tolerance of approximately plus-or-minus ten feet, further limiting their range. RFID and IR-based sensors, though, are highly susceptible to drift due to interference in the environment (e.g., a patient room) and cross talk between locations that are physically separated, but have a line of sight between them (e.g., two patient rooms across the hall from each other).

Therefore, it would be desirable to design a system and method for tracking locations and interactions between people and assets in an environment with minimal infrastructure requirements and standardized technologies.

BRIEF DESCRIPTION

Certain examples provide improved, automatic, and dynamic frequency selection for and/or by medical body area network apparatus.

Certain examples provide a medical body area network apparatus. The example apparatus includes a radio to receive a beacon signal and a processor to process the beacon signal to determine a location of the apparatus. The example processor is configured to at least: when the beacon signal indicates a first location, communicate via a first frequency band; and when the beacon signal indicates a second location, communicate via a second frequency band.

Certain examples provide a computer readable storage medium including instructions which, when executed, cause a processor to at least implement a method to control a medical body area network device by at least: processing a beacon signal to determine a location of the medical body area network device; when the beacon signal indicates a first location, communicating via a first frequency band; and when the beacon signal indicates a second location, communicating via a second frequency band.

Certain examples provide a method to control a medical body area network device. The example method includes processing, using a processor, a beacon signal to determine a location of the device. The example method includes, when the beacon signal indicates a first location, communicating via a first frequency band. The example method includes, when the beacon signal indicates a second location, communicating via a second frequency band.

BRIEF DESCRIPTION OF THE DRAWINGS

The features and technical aspects of the system and method disclosed herein will become apparent in the following Detailed Description set forth below when taken in conjunction with the drawings in which like reference numerals indicate identical or functionally similar elements.

DETAILED DESCRIPTION

Figure 1:
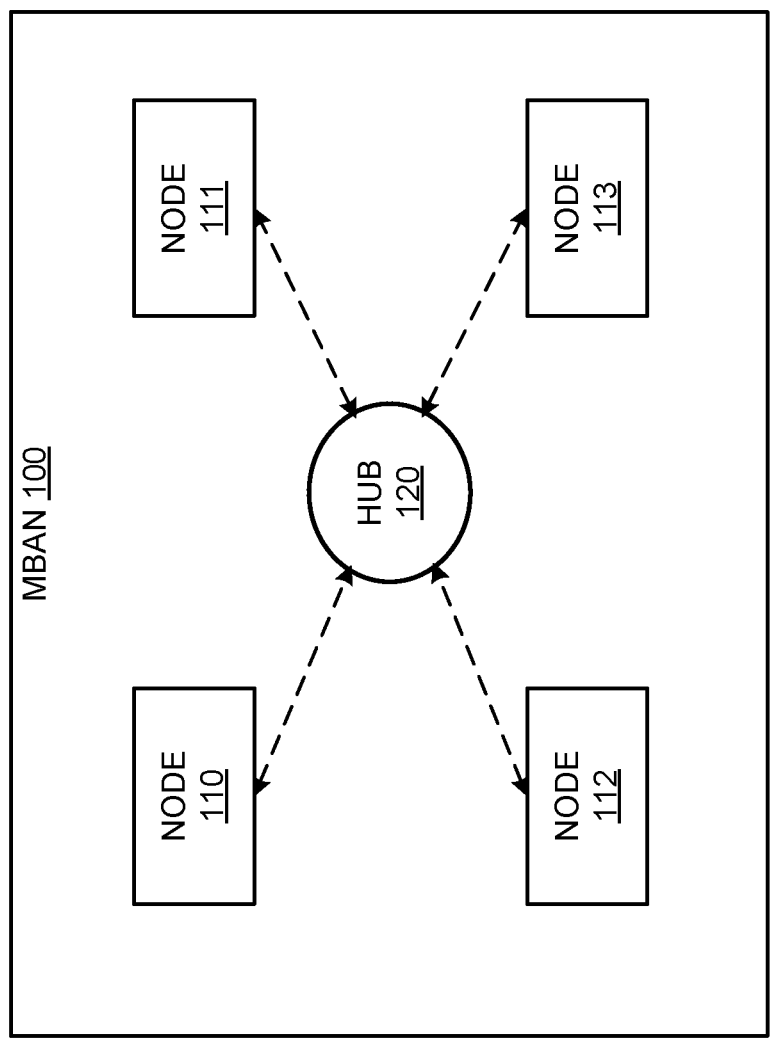
FIG. 1 illustrates an example medical body area network (MBAN) including a plurality of nodes or devices in communication with a hub.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

Example Medical Body Area Network Systems

Certain examples of the presently disclosed technology improve proximity detection and location tracking of patients and/or other resources in a healthcare environment such as a hospital, clinic, surgical center, doctor's office, etc.

In wireless patient monitoring, device(s) on a patient use, by default, frequencies within a pre-defined spectrum (e.g., an industrial, scientific and medical (ISM) radio band such as 2.4-2.48 GHz, etc.) for transmitting and receiving patient sensor data. While operating in a healthcare facility, such as a hospital, etc., these devices have access to a protected frequency spectrum known as a medical body area network (MBAN, such as 2360-2400 MHz, etc.). For example, within the healthcare facility, an MBAN device can get access to the MBAN spectrum (2.36-2.4 GHz) from a Frequency Coordinator regulated by the Federal Communications Commission (FCC) outside the healthcare facility. However, once the device leaves the healthcare facility, access to the pre-defined, reserved, or "protected" MBAN communication spectrum is denied.

A body area network is a wireless network of wearable computing devices. An MBAN is a wireless network of wearable computing devices that monitor and/or affect patient health, such as sensors, pumps, meters, monitors, etc. An MBAN is a low power network including a plurality of body-worn sensors that transmit a variety of patient data (e.g., temperature, blood glucose level, blood pressure, pulse and respiratory function, etc.) to a control device. The MBAN eliminates cables tethering the patient to a bed and provides real-time (or substantially real time given data transmission and processing latency) data to healthcare practitioners. Wireless medical devices can be used to actively monitor a patient's health, including blood glucose and pressure monitoring, delivery of electrocardiogram readings, neonatal monitoring, etc. Data can be gathered for storage, processing, transmission, etc., such as to a control device, patient electronic medical record, display, etc. Connected device(s) can also be used to deliver medical therapy to certain body area(s), for example.

FIG. 1 illustrates an example MBAN 100 including a plurality of nodes or devices 110-113 in communication with a hub 120. The hub device 120 can be a master programmer/control transmitter included in a device close to the patient. The nodes 110-113 are client transmitters (e.g., body sensors and/or other medical/monitoring devices) worn by the patient and transmit information to the hub 120 when in communication with the hub 120. The hub 120 transmits data messages to the nodes 110-113 to specify, for example, a transmit frequency to be used for data communication.

For example, 40 MHz of MBAN spectrum (e.g., from 2360-2400 MHz or 2.36-2.4 GHz, etc.) can be allocated for MBAN communication. The 2360-2390 MHz portion of the band (a secondary or lower portion of the MBAN spectrum) is reserved for indoor use inside healthcare facilities (e.g., with a transmit power of 1 mW measured over 1 MHz bandwidth, etc.) and involves registration with an MBAN frequency coordinator for use. The 2390-2400 MHz band (a primary or upper portion of the MBAN spectrum) does not involve registration and coordination and can be used in any location (e.g., indoor or outdoor, with a transmit power of 20 mW measured over 5 MHz bandwidth, etc.).

Since many devices, medical and otherwise, operate in the 2.4 GHz ISM band, this ISM band (2.4-2.48 GHz) can become quite crowded, resulting in device interference, data loss, etc. Enabling an MBAN device to utilize the lower spectrum (e.g., 2.36-2.4 GHz) as much as possible while within a healthcare facility helps to ease conflicts in the 2.4 GHz ISM frequency band and facilitate improved, more accurate, and faster communications between MBANs and hospital networks.

The hub 120 aggregates patient data from the node devices 110-113 under its control and transmits that information (e.g., via a network, such as a local area network (LAN) and/or other Ethernet, WiFi, Bluetooth, etc., network associated with the healthcare facility) to a control point and/or other data storage and/or processing server to monitor and process the collected patient data. For example, the monitored data can be used to trigger an alert for the patient and/or a healthcare practitioner, adjust a treatment plan, schedule an appointment, etc., and/or other clinical task.

In certain examples, the control point for the healthcare facility coordinates operations for the MBAN 100 (and other MBANs that may be in the healthcare facility). The control point helps to coordinate MBAN operations in the 2360-2390 MHz frequency band and protect MBAN communications from interference within that protected/reserved band. The control point also restricts MBAN communication when such communication may interfere with communication from "primary" devices or users in a healthcare environment (e.g., hospital systems, healthcare providers, aeronautical mobile telemetry, etc.). In certain examples, the control point receives an electronic key specifying frequency(-ies) for use by the MBAN 100 and its devices. The control point sends a control message to the hub 120 to specify authorized frequency(-ies) and/or other operating parameter(s) for the hub 120 and nodes 110-113 in that MBAN 100.

Certain examples provide systems and associated methods to provide automatic frequency band selection for wireless patient monitoring devices depending on their physical location (e.g., either inside or outside of a healthcare facility, etc.). Certain examples provide automated and/or other seamless frequency band selection based on multiple factors. Example factors for automated frequency band selection include location, active band monitoring, coordination, etc.

For example, location can influence frequency selection. If the MBAN 100 is within the healthcare facility (e.g., in the hospital, etc.), then devices in the MBAN 100 can use the ISM plus full MBAN frequency range (e.g., full MBAN range of 2.36-2.4 GHz with reduced outdoor range of 2.39-2.4 GHz). However, outside the bounds of the healthcare facility, devices of the MBAN 100 are limited to the ISM plus a reduced MBAN frequency range.

Another example factor is active band monitoring. For example, access to the MBAN 100 can be based on the detection of wireless implants using a frequency band. The wireless implants have priority usage of the frequency band, and MBAN 100 devices are to vacate that frequency band automatically after detecting the presence of the wireless implants. However, if no competing wireless implants are detected, MBAN 100 devices can proceed to use the frequency band.

Another example factor is coordination. For example, a Federal Communications Commission (FCC)-assigned coordinator in an area sends control messages to nearby hospitals to indicate availability of the full MBAN spectrum for in-hospital use at a time. Wireless devices defer to reduced frequency bands (ISM) as indicated by these control messages.

Thus, certain examples use these and/or other factors to provide information to medical devices, including medical body area networks (MBANs) 100, regarding location in or outside of a healthcare facility, such as a hospital, clinic, doctor's office, etc., based on which the devices are permitted or not permitted to operate in the MBAN frequency band (e.g., 2360-2390 MHz).

As described above, MBAN devices can use unlicensed industrial, scientific and medical (ISM) radio band(s) (e.g., 2.4-2.48 GHz) to transmit a patient's physiological and other data between the wearable sensors 110-113 and the hub 120. Other medical and non-medical devices (e.g., laptops, cell phones, monitors, etc.) can also use the frequency band. Therefore, the data links in the ISM band can be prone to issues (e.g., interference, packet collisions, network congestion, etc.) that may significantly degrade the quality of communications. One way to increase the reliability of the communication is to enable MBANs 100 to operate in the MBAN frequency band. The MBAN spectrum (e.g., 2360-2400 MHz) is provided as a dedicated spectrum to medical devices, and the spectrum should be free of WiFi and other high interferers, which commonly operate in the ISM band. The MBAN devices can operate in a lower part of the spectrum (e.g., 2360-2390 MHz) on a secondary basis, meaning that their activity in this band is subject to approval from the primary band user. In certain examples, coordination between the primary and secondary user is done through a regulatory body called Frequency Coordinator whose role is to notify the healthcare facility when the primary user is going to use the MBAN spectrum. In this case, the MBAN devices should cease operations from the MBAN spectrum to accommodate the primary user.

In addition, in order to use the 2360-2390 MHz band, the MBAN devices are to be located inside the healthcare facility to help reduce, minimize, or prevent potential interference with the primary spectrum user. Therefore, the MBAN 100 should have or receive information relating to whether or not the MBAN 100 is located inside or outside the healthcare facility in order to use the MBAN spectrum.

Figure 2:
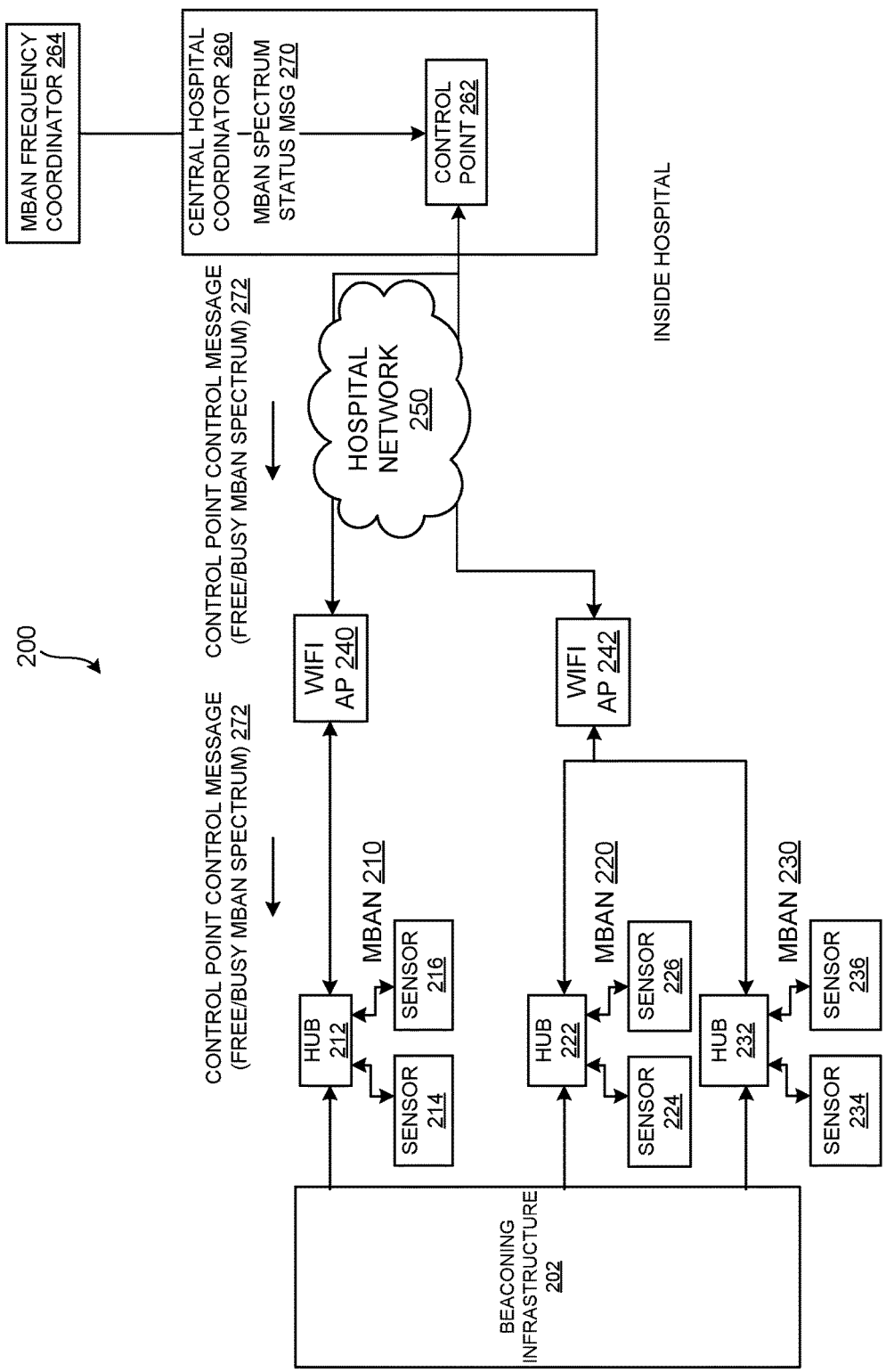
FIG. 2 illustrates an example communication infrastructure of a wireless patient monitoring system.

FIG. 2 illustrates an example communication infrastructure of a wireless patient monitoring system 200. The example system 200 is illustrated in the context of a hospital but can be applied to other healthcare facilities or environments such as clinics, doctor's offices, etc.

The example system 200 includes a beaconing infrastructure 202 in communication with a plurality of MBANs 210, 220, 230. Each MBAN 210, 220, 230 includes a hub 212, 222, 232 and associated sensors 214, 216, 224, 226, 234, 236. The hub 212 communicates with a wireless access point (AP) 240. The hubs 222, 232 communicate with a wireless AP 242. The wireless APs 240, 242 facilitate access to a hospital network 250 which interacts with a central hospital coordinator 260. The central coordinator 260 includes a control point 262 to coordinate messages and control of the MBANs 210, 220, 230 and/or other hardware/software in the system 200. In certain examples, the central hospital coordinator 260 receives input from an MBAN frequency coordinator 264 to set certain frequency(-ies) for MBAN communication usage.

As shown in the example of FIG. 2, the central coordinator 260 generates a MBAN spectrum status message 270 regarding a status of a frequency spectrum available to the MBAN 210, 220, 230. The status message 270 is provided to the control point 262, which communicates via the hospital network 250 to provide a control point control message (CPCM) 272 regarding free and/or busy MBAN spectrum (e.g., available MBAN communication frequency spectrum). The control message 272 can be routed by the APs 240, 242 to the hubs 212, 222, 232. Thus, the hubs 212, 222, 232 are made aware of available frequency spectrum for MBAN communication (or lack/restriction thereof) inside the hospital and/or other healthcare facility.

Figure 3A:
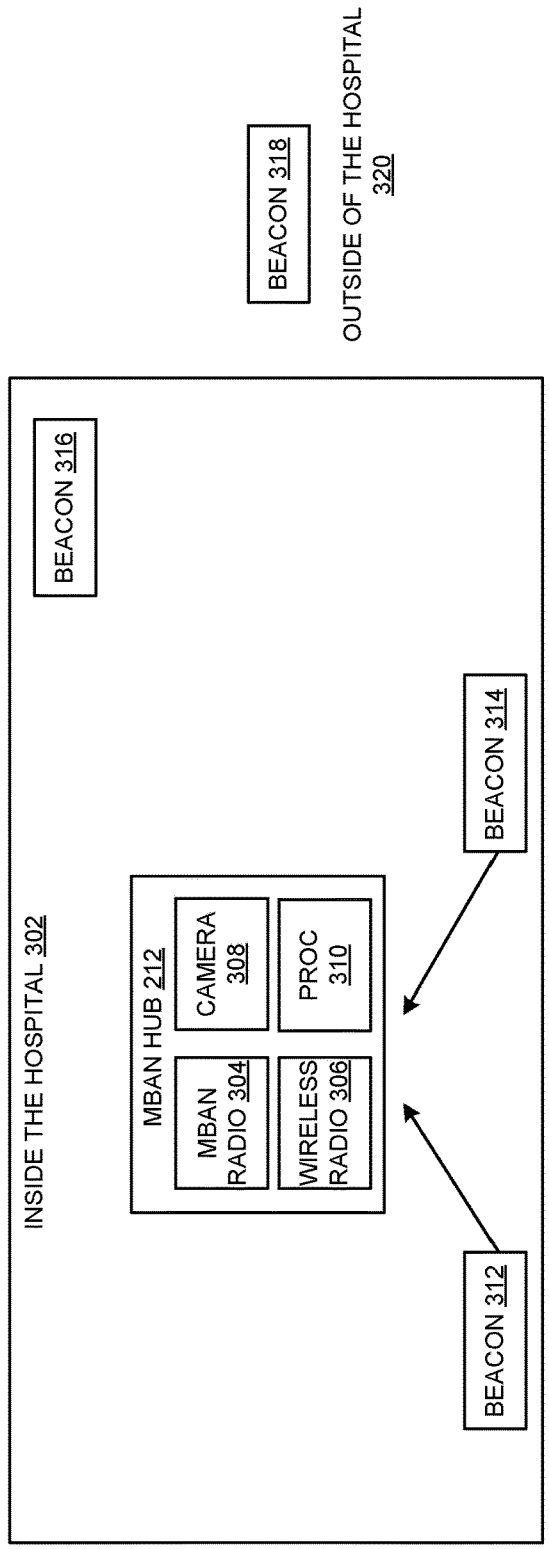
FIGS. 3A-3C show example beacon configuration with respect to an MBAN hub.

FIG. 3A illustrates an example beacon configuration inside the hospital (and/or other healthcare facility) 302. As shown in the example of FIG. 3A, the MBAN hub 212 (and/or other hub 222, 232, etc.) includes an MBAN radio 304, a long range (e.g., WiFi, etc.) radio 306, a camera 308, and a processor 310. The hub 212 receives a signal from beacons 312, 314 when the hub 212 is near those beacons 312, 314. As shown in the example of FIG. 3A, the hub 212 does not receive a signal from beacon 316 or beacon 318 because the hub 212 is not within range of those beacons 316, 318. The beacons 312-318 can be visible light communication (VLC) beacons, Bluetooth Low Energy (BLE) beacons, radio frequency identification (RFID) beacons, near field communication (NFC) beacons, etc.

Figure 3B:
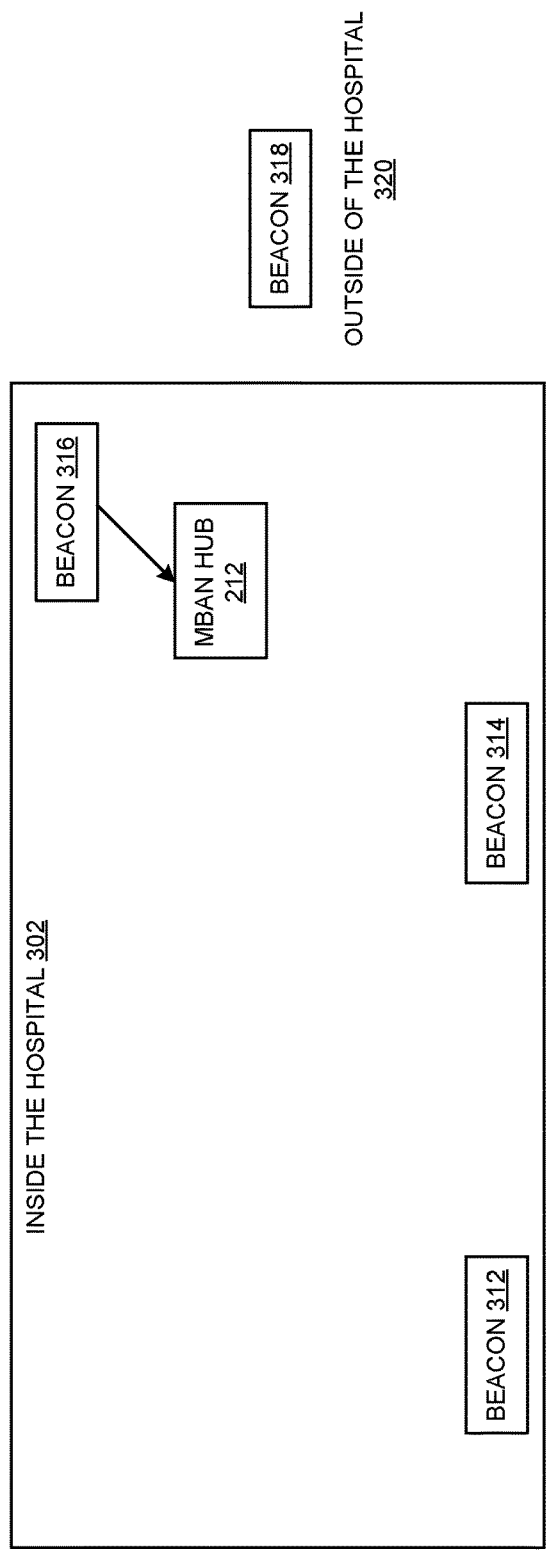

However, the example of FIG. 3B shows the example hub 212 within range of the beacon 316, rather than beacons 312, 314. The MBAN 100 and associated patient may be moving toward the door and/or other exit from the hospital 302 when approaching and/or otherwise near the beacon 316, for example. In certain examples, the hub 212 can determine its proximity to the beacon 316 (and, therefore, to the exit from the hospital 302) based on a characteristic of the signal from the beacon 316 (e.g., received signal strength indicator (RSSI), signal encoding/identifier, etc.).

Figure 3C:
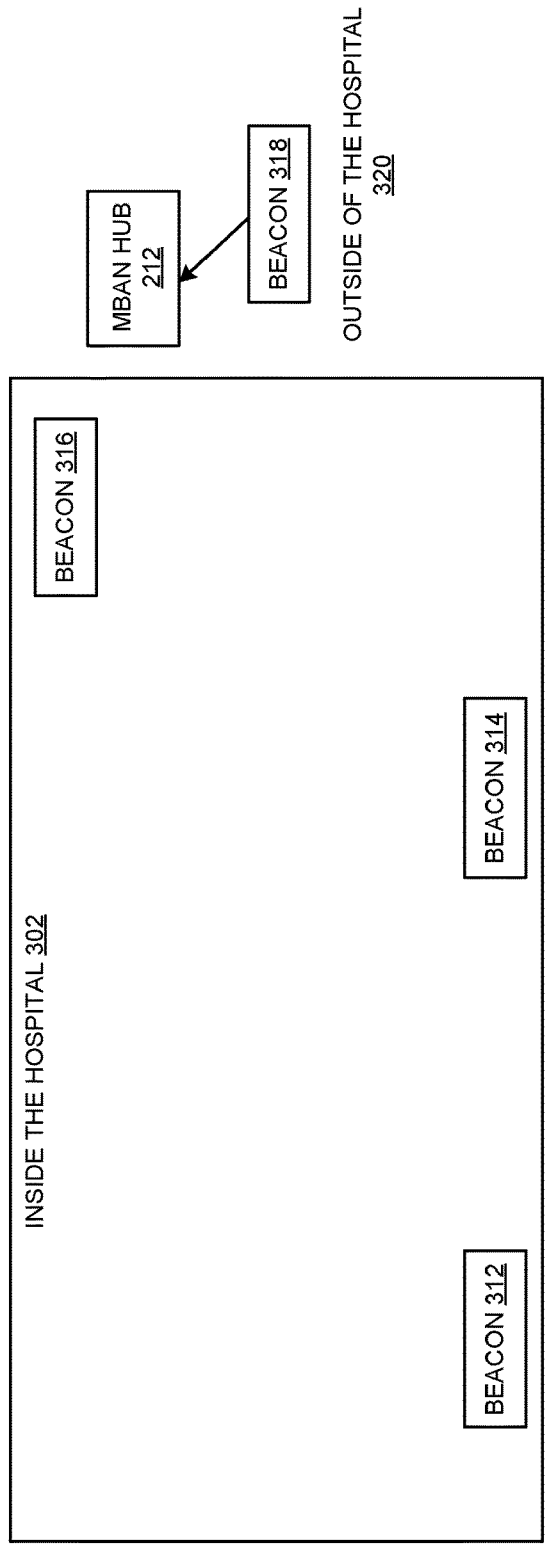

As shown in the example of FIG. 3C, the hub 212 is within proximate range of the beacon 318. Since the hub 212 is within range of the beacon 318, the hub 212 can be determined to be outside of the hospital 320.

Returning to the example system 200 of FIG. 2, the example system 200 enables frequency band switching by the MBAN hubs 212, 222, 232. Information regarding MBAN spectrum availability is obtained from an FCC-designated body (e.g., an MBAN Frequency coordinator). This message is received by the hospital (e.g., the central coordinator 260). The central coordinator 260 includes a service point (e.g., the control point 262) that periodically broadcasts MBAN status information in a control message 272 to all MBAN hubs 212, 222, 232 (e.g., patient monitors). The control message 272 is transmitted through the existing hospital network infrastructure 240, 242, 250 (e.g., WiFi network, etc.).

If the MBAN spectrum is available for use, then the hub 212, 222, 232 determines whether the hub 212, 222, 232 is located within the hospital 302 or outside of the hospital 320. If the MBAN spectrum has been made available for use, then the hub 212, 222, 232 can check its position (e.g., in or out of the hospital) to determine whether the hub 212, 22, 232 is allowed to utilize the full MBAN spectrum that has been made available. As shown in FIGS. 3A-3C, one way to provide the patient monitors (e.g., hubs 212, 222, 232) with location information is using strategically placed beacon devices 312-316 throughout the hospital (e.g., forming part of the beaconing infrastructure 202, etc.), as well as outside 318 the hospital 320. For example, the beacon device 312-318 can emit a periodic signal at a certain frequency channel in the ISM band, which is known by all hubs 212, 222, 232. A hub 212, 222, 232 can sporadically/periodically listen for an infrastructure beacon 312-316 on this channel when the channel is not occupied with handling patient and control data. If the hub 212, 222, 232 receives the infrastructure beacon, the hub 212, 222, 232 concludes that it is in the hospital 302. In addition, to reduce occurrence of checking for the infrastructure beacon signal, checking for the infrastructure beacon 312-316 can be coupled with hub 212, 222, 232 motion information. For example, accelerometer information (e.g., which can be either on the hub 212, 222, 232 or on the patient's body) is available. For example, if the hub 212, 222, 232 receives the infrastructure beacon signal and the hub 212, 222, 232 does not move after that, then the hub 212, 222, 232 assumes that the hub's position remains the same during the non-motion period.

Alternatively or in addition, location information can be obtained by the hub 212, 222, 232 by broadcasting a location request to the beacon location infrastructure 202. If the hub's location request is received by the location beacon 312-318, the location beacon 312-318 should reply with a short message to the hub 212, 222, 232 indicating its presence. The message from the location beacon 312-318 can be sent after a short, random delay to avoid a situation in which messages from different beacons 312-318 are sent at the same time. Messages sent simultaneously or substantially simultaneously can collide, resulting in the location information not being received by the hub 212, 222, 232. If the hub 212, 222, 232 receives more than one location beacon message, the hub 212, 222, 232 can assume that it is in proximity of the location beacon 312-318 whose message has the strongest signal. In certain examples, the MBAN hub 212, 222, 232 is a battery-powered device that can request location information when necessary or desired, rather than periodically listening and waiting to receive the location message.

Another way of checking whether the patient (and, by extension, the hub 212, 222, 232) moves is by monitoring change in signal strength (RSSI) between the on-body sensors 214, 216, 224, 226, 234, 236 and the associated hub 212, 222, 232. If the signal strength varies rapidly over time, the hub 212, 222, 232 can conclude that the patient is moving, for example. If the hub 212 and its sensors 214, 216 move past the beacon 316 into range of the beacon 318, for example, the hub 212 can conclude that the patient and his/her MBAN 210 are now outside the hospital 320.

Another implementation of infrastructure-based beaconing involves a combination of two or more beaconing methods/systems to provide increased location accuracy with respect to being either inside or outside the hospital. If a device 212, 222, 232 uses only WiFi-based location services, the device 212, 222, 232 may still be able to receive WiFi signals, such as the CPCM 272, outside of the hospital, where the hub device 212, 222, 232 is unable to use the MBAN-dedicated spectrum. The device 212, 222, 232 may not switch to ISM-only frequencies if it can still receive the CPCM 272. Using the beacon 318 and/or other positioning service that is strategically placed at only entrance(s) and/or exit(s), the location of the device 212, 222, 232 can be determined. A combination of the two (or more) positioning services can then provide sufficient information to allow the device 212, 222, 232 to know whether it is inside or outside the hospital structure.

An example of an additional positioning system is radio frequency identification (RFID). If the device 212, 222, 232 is carried outside the hospital but is still able to receive CPCM messages 272, passing through the exit (with an RFID scan) can trigger an algorithm to begin actively monitoring the signal strength of the received CPCM messages 272. In such examples, the MBAN hub 212, 222, 232 can have an RFID tag attached to the hub 212, 222, 232 with RFID readers installed at hospital exits/entrances. When the hub 212, 222, 232 passes through the hospital entrance, the RFID reader reads the RFID tag. The RFID reader sends this information to the central hospital coordinator 260. Information indicating that the hub 212, 222, 232 has passed through a hospital door can be relayed to the hub 212, 222, 232 in the next CPCM message 272. When the hub 212, 222, 232 receives this information, the hub 212, 222, 232 can start measuring the received signal strength (RSS) of several consecutive CPCM messages 272. If the RSS decreases over these CPCM messages 272, the hub 212, 222, 232 can conclude that it is moving away from the hospital, for example.

If the signal strength is determined to be decreasing (as the device 212, 222, 232 is carried further away from the hospital), it can be empirically determined that the device 212, 222, 232 is outside 320 and is not allowed to use MBAN-dedicated spectrum. Conversely, if the device 212, 222, 232 re-enters the hospital 302 and observes an increase in signal strength after the RFID system triggers the algorithm, it is determined that the device 212, 222, 232 is inside the hospital 302, and is able to use MBAN-dedicated spectrum, for example.

Another system and method to detect position of the MBAN 210, 220, 230 is by using Service Set Identification (SSID) of the WiFi Access Points (AP) 240, 242. For example, the AP 240, 242 that are placed close to hospital entrance(s) can be associated with a different SSID (labeled as "door", for example) than AP 240, 242 placed more internal to the hospital. The WiFi radio 306 on the hub 212 performs a spectrum scan to detect all APs 240, 242 in its vicinity. The scanning operation provides a list of detected APs 240, 242, their SSIDs, and received signal strength (RSS) from each AP 240, 242, for example. The hub 212 can use SSID information to determine whether or not the hub 212 is inside or outside the bounds of the hospital and/or other healthcare facility. In certain examples, the SSID information can be used by the hub 212 to decide whether it is in or out of the facility. For example, if the hub 212 roams to the AP 240, 242 with a strategically selected SSID that indicates the vicinity of a hospital entrance/exit (e.g., a door), the SSID can be interpreted by the hub 212 as being outside 320 of the hospital.

In certain examples, a location of the hub 212 within 302 or outside 320 a healthcare facility can be determined using a light sensor (e.g., a photo transistor, photodiode, camera 308, etc.) on the hub 212. The beacon infrastructure 202 units 312-318 can include infrared emitter and/or visible light fixtures that emit at least a single code that can be received and decoded by the light sensor on the hub 212.

In certain examples, a location of the hub 212 within 302 or outside 320 a healthcare facility can be determined using the camera 308 on the hub 212. The infrastructure 202 beacon units 312-318 can include a visible light source such as light-emitting diode (LED) light fixtures, etc., that can be modulated by a high frequency visible light code that is invisible for a human eye. The camera 308 can read this code to detect its presence within the hospital 302, for example.

Alternatively or in addition, RFID and/or NFC sensors deployed at hospital entrance(s) and/or exit(s) can detect MBAN hub 212, 222, 232 position (e.g., inside 302 the hospital versus outside 320 the hospital, etc.). In certain examples, such sensors can identify position of the hub 212, 222, 232 in a particular ward or wing within a hospital, etc.

Example Beaconing Infrastructure

The example beaconing infrastructure 202 including beacons 312-318 can be implemented using one or more beacon tags affixed to assets within the healthcare environment that transmit (e.g., periodically, aperiodically and/or as a one-time event) beacon messages. The beacon messages are received by a mobile reader badge, such as the MBAN hub 212, 222, 232 that listens for beacon messages transmitted in the environment. For example, disclosed example reader badges (sometimes referred to herein as "readers," "badges" or "mobile wireless bridges") may include a network interface to receive beacon messages transmitted via low power Bluetooth Low Energy (BLE) and/or other low-power, short-range radio frequency wireless communication. In some disclosed examples, the reader badges process the received beacon messages and communicate information obtained from the beacon messages to one or more real-time location services (RTLS) servers via a communication infrastructure. For example, disclosed example reader badges may aggregate and communicate a batch of beacon messages (e.g., a threshold number of beacon messages, a threshold interval of time (e.g., a window of interest), etc.) to an RTLS server via a WiFi infrastructure (e.g., a wireless network). In some disclosed examples, the RTLS server processes the received batch of beacon messages to facilitate real-time location tracking of the resources in the environment. In some disclosed examples, the RTLS server may report the location of resources via charts, graphs, tables, etc.

In certain examples, real-time location services enable improved patient workflow via proximity detection and location tracking in a healthcare environment, such as a hospital. Location tracking can be used to locate resources such as mobile assets (e.g., patients and/or their MBANs 210, 220, 230, intravenous (IV) pumps, telemetry units, wheelchairs, etc.) within the hospital.

Example systems and methods disclosed herein facilitate improved proximity detection and location tracking by creating a hospital tracking network within the hospital using the communication infrastructure already installed in the hospital. For example, beacon tags are installed throughout a location or building. Beacon tags can be affixed to stationary assets (e.g., patient room entry ways, sinks, water fountains, hallways, etc.), for example. Beacon tags are low-cost, low-power transmitters of beacon messages. A beacon message (sometimes referred to herein as a "beacon") includes information about the beacon tag such as a unique identifier (e.g., a tag identifier such as a media access control (MAC) address), etc. In some disclosed examples, the beacon tags broadcast (e.g., advertise, communicate, transmit, etc.) beacon messages at pre-set frequencies (e.g., ten times a second, once a second, once a minute, etc.). For example, a beacon tag affixed to a fixed-location asset (e.g., a sink, a doorway, etc.) may broadcast beacon messages ten times a second.

A reader badge or hub 212, 222, 232 is a mobile wireless bridge that facilitates mobile tracking by "listening" and receiving beacon messages broadcast by beacon tags. The wireless radio 306 and/or other radio 304, processor 310, etc., of the hub 212 can include and/or implement, for example, a low-power, short-range radio frequency wireless controller to receive connection-less beacon messages broadcast by beacon tags. The reader badge hub 212, 222, 232 may be worn or transported by hospital caregivers. For example, a reader badge hub 212, 222, 232 may be worn as a lanyard or clipped to the caregiver's clothing. As the caregiver moves about the hospital, the reader badge hub 212, 222, 232 passively collects beacon messages and communicates reader messages to an RTLS server at the backend of the system (e.g., part of the infrastructure 202, the control point 262, coordinator 260, etc.). In some examples, the reader badge hub 212, 222, 232 collects a number (e.g., a predetermined number) of beacon messages or waits a period (e.g., a predetermined period of time) prior to communicating the reader messages. In some examples, the reader badge hub 212, 222, 232 generates and communicates a reader message as a beacon message from a beacon tag is received. A reader message includes information received from the beacon message such as a unique identifier of the source beacon tag and a spatial location of the source beacon tag. In some examples, the reader badge hub 212, 222, 232 includes a timestamp identifying when the beacon message was received by the hub 212, 222, 232 in the reader message. In some examples, the reader badge hub 212, 222, 232 includes a received signal strength indication (RSSI) value (e.g., a power ratio in decibels of the measured power to one milli-watt (dBm)).

Example hubs 212, 222, 232 utilize the processor 310 configured as a proximity engine to process the beacon messages and determine distance from the source (e.g., the beacon tag that broadcast the corresponding beacon message). The hub 212, 222, 232 can then determine whether it is inside 302 or outside 320 the healthcare facility and, as a result, which frequency(-ies) are available for MBAN 210, 220, 230 use, for example.

As the patient moves about the hospital, for example, the hub 212, 222, 232 may receive beacon messages from each of the beacon tags. The proximity engine of the processor 310 can determine the RSSI strength for each of the beacon messages and associate RSSI strength with a respective beacon tag.

In some examples, the proximity engine implemented by the processor 310 determines which beacon tags are proximate (e.g., near or closely located) to the hub 212, 222, 232. For example, the proximity engine can compare the RSSI strength of a beacon message to a threshold and if the RSSI strength satisfies the threshold (e.g., the RSSI strength is greater than a threshold), the proximity engine identifies the source beacon tag as proximate to the reader badge hub 212, 222, 232. In some examples, the proximity engine discards beacon messages that are not proximate to the reader badge hub 212, 222, 232.

Example Methods for MBAN Control

Figure 4:
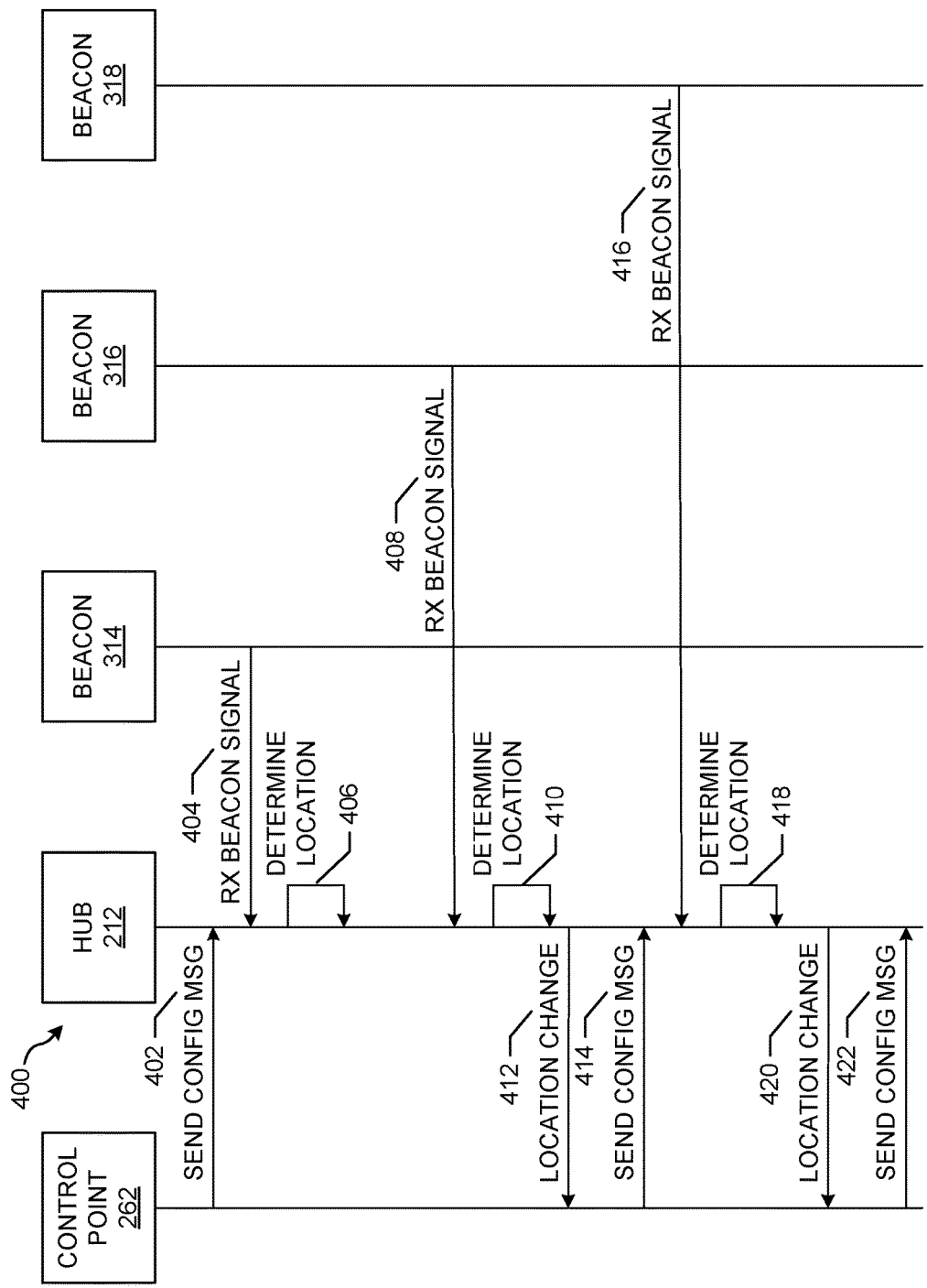
FIG. 4 illustrates an example data flow between a control point, an MBAN hub, and beacons.

The foregoing systems and methods can be deployed to provide real-time location services. Real-time location services (RTLS) facilitate tracking people and assets in a healthcare setting, such as a hospital. FIG. 4 illustrates an example data flow 400 between the control point 262, MBAN hub 212, and beacons 314, 316, 318.

At 402, a configuration message 272 is sent from the control point 262 to the hub 212. For example, the control point 262 provides an indication to the hub 212 allowing the hub 212 to use the full frequency spectrum of 2360-2400 MHz in the hospital 302 to communicate with sensors 214, 216, AP 240, hospital network 250, etc.

At 404, the hub 212 receives a first beacon signal from the beacon 314. In certain examples, the first beacon signal includes an indication of the beacon 314 and/or an associated signal strength, etc. At 406, the hub 212 determines its location. The signal identifies the beacon 314, for example, and alerts the hub 212 that the hub 212 is within range of the beacon 314. The hub 212 can determine its location with respect to the hospital (e.g., inside 302 or outside 320 the hospital, etc.) based on beacon 314 identifier, received signal strength, etc.

At 408, the hub 212 receives a second beacon signal from the beacon 316. In certain examples, the second beacon signal includes an indication of the beacon 316 and/or an associated signal strength, etc. At 410, the hub 212 determines its location. The signal identifies the beacon 316, for example, and alerts the hub 212 that the hub 212 is within range of the beacon 316. For example, the hub 212 has now moved from near beacon 314 to near beacon 316 but is still within the hospital 302. The hub 212 can determine its location with respect to the hospital (e.g., inside 302 or outside 320 the hospital, etc.) based on beacon 316 identifier, received signal strength, etc.

At 412, the hub 212 notifies the control point 262 of the change in location. At 414, the control point 262 provides an updated configuration message 272 to the hub 212. For example, the control point 262 provides an indication to the hub 212 allowing the hub 212 to use the full frequency spectrum of 2360-2400 MHz in the hospital 302 to communicate with sensors 214, 216, AP 240, hospital network 250, etc.

At 416, the hub 212 receives a third beacon signal from the beacon 318. In certain examples, the third beacon signal includes an indication of the beacon 318 and/or an associated signal strength, etc. At 418, the hub 212 determines its location. The signal identifies the beacon 318, for example, and alerts the hub 212 that the hub 212 is within range of the beacon 318. For example, the hub 212 has now moved from near beacon 316 to near beacon 318 and is now outside the hospital 320. The hub 212 can determine its location with respect to the hospital (e.g., inside 302 or outside 320 the hospital, etc.) based on beacon 318 identifier, received signal strength, etc.

At 420, the hub 212 notifies the control point 262 of the change in location. For example, the hub 212 is now outside 320 rather than inside 302 the hospital. At 422, the control point 262 provides an updated configuration message 272 to the hub 212. For example, the control point 262 provides an indication to the hub 212 that the hub 212 is now restricted to the primary 2390-2400 MHz (2.39-2.4 GHz) frequency band since the hub 212 is outside the hospital 320.

Thus, in certain examples, the hub 212 interacts with the control point 262 and beacons 314-318 to utilize available frequency spectrum for communication with sensors 214, 216 and/or other hospital systems based on a dynamic, real-time (or substantially real-time given processing, storage, and/or data transmission latency) determination of location inside or outside a healthcare facility. However, since the control point 262 may only periodically broadcast CPCM control messages, the hub 212 can independently decide whether the hub 212 is inside 302 or outside 320 the hospital and/or other healthcare facility based on locational information with respect to beacons 312, 314, 316, 318 to determine whether the hub 212 can or cannot use the MBAN (e.g., 2360-2390 MHz) spectrum.

Certain examples provide a technical improvement to innovate around limitations placed on available bandwidth and data usage among a plurality of competing devices in a variety of locations. Certain examples create a new, innovative MBAN configuration and interaction between control point 262, hub(s) 212, 222, 232, beacons 312, 314, 316, 318, etc., to determine location and authorization for certain frequency data communication distinct from prior MBAN frequency usage.

Figure 5:
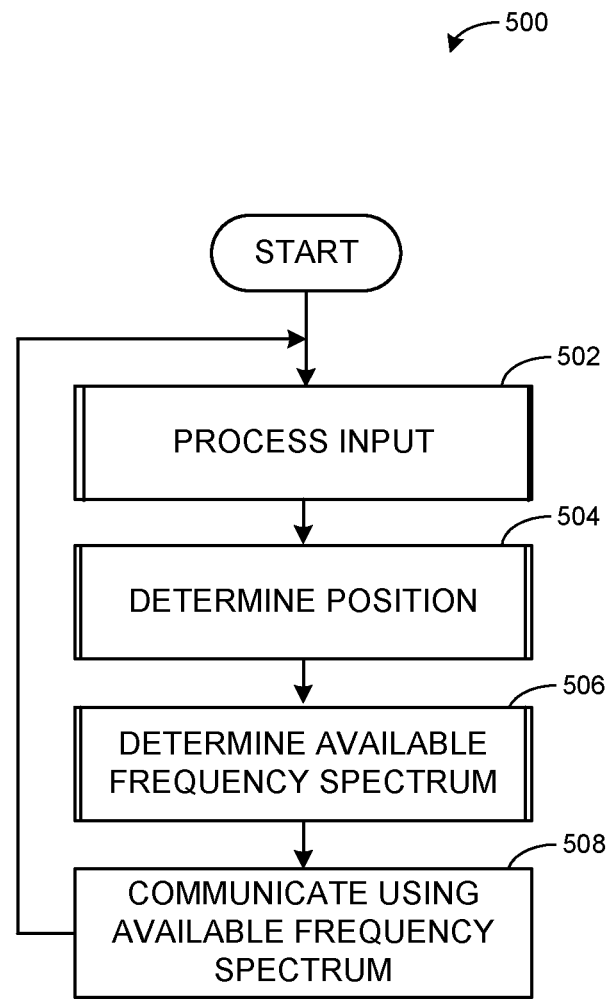
FIGS. 5-10 illustrate flow diagrams of example methods to control frequency band operation of an MBAN.

FIG. 5 illustrates a flow diagram of an example method 500 for MBAN communication. The example method 500 provides a high-level overview that is expanded in particular examples of FIGS. 6-10. MBANs 210, 220, 230 can use all or part of the MBAN spectrum based on availability, location, and/or other input, etc.

At block 502, available input is processed. One or more pieces of input information can be processed by the hub 212, 222, 232 to help determine MBAN 210, 220, 230 position/location information. For example, a control message (e.g., CPCM 272 from control point 262), location information (e.g., from RFID, beacon 312-318, etc.), and/or other MBAN 210, 220, 230 input, if available, can be processed by the hub 212, 222, 232.

If a control message is available, for example, then the control message is processed and/or otherwise evaluated. For example, if the CPCM 272 is present, the message 272 can indicate whether or not the MBAN spectrum is granted for use. If the control message indicates that the MBAN spectrum is not granted for use, then the process 500 ends. If the control message indicates that the MBAN spectrum is granted for use, then the process 500 continues to determine if the location of the hub 212, 222, 232 qualifies for use of the full MBAN spectrum or only partial spectrum. If a control message is not available and/or otherwise not applicable, then other input such as input with respect to the beaconing infrastructure 202, RFID, etc., can be processed by the hub 212, 222, 232

At block 504, position is determined based on the processed input. For example, position can be determined with reference to the beaconing infrastructure 202, etc. Position can be determined based on RFID, received signal strength, and/or other indication and/or measurement, for example. For example, the hub 212, 222, 232 can identify its location inside or outside the hospital based on the RFID indication received by the wireless radio 304 and/or MBAN radio 306. Other beacon 312-318 information can be received by radio(s) 304 and/or 306 and used by the hub 212, 222, 232, alone or in combination (e.g., to triangulate between two inputs and the MBAN 210, 220, 230, etc.), to determine whether the MBAN 210, 220, 230 is inside 302 or outside 320 the hospital, for example.

At block 506, based on the determined position, an available frequency spectrum is determined. For example, based on location (e.g., inside the hospital or outside the hospital), an ability to use a full (e.g., 2630-2400 MHz) or reduced (e.g., 2690-2400 MHz) MBAN spectrum is determined. The presence and content of a control message 272 can also indicate whether or not MBAN spectrum is available to be used. In certain examples the CPCM 272 indicating that the MBAN spectrum is available for use, pending MBAN 210, 220, 230 location, is a prerequisite for a location determination by the hub 212, 222, 232. At block 508, data communication is facilitated via the allowed spectrum. For example, status information, monitoring information, vitals, exercise data, etc., can be broadcast from the hub 212, 222, 232 via the allowed portion (e.g., full, reduced, etc.) of the MBAN spectrum.

Figure 6:
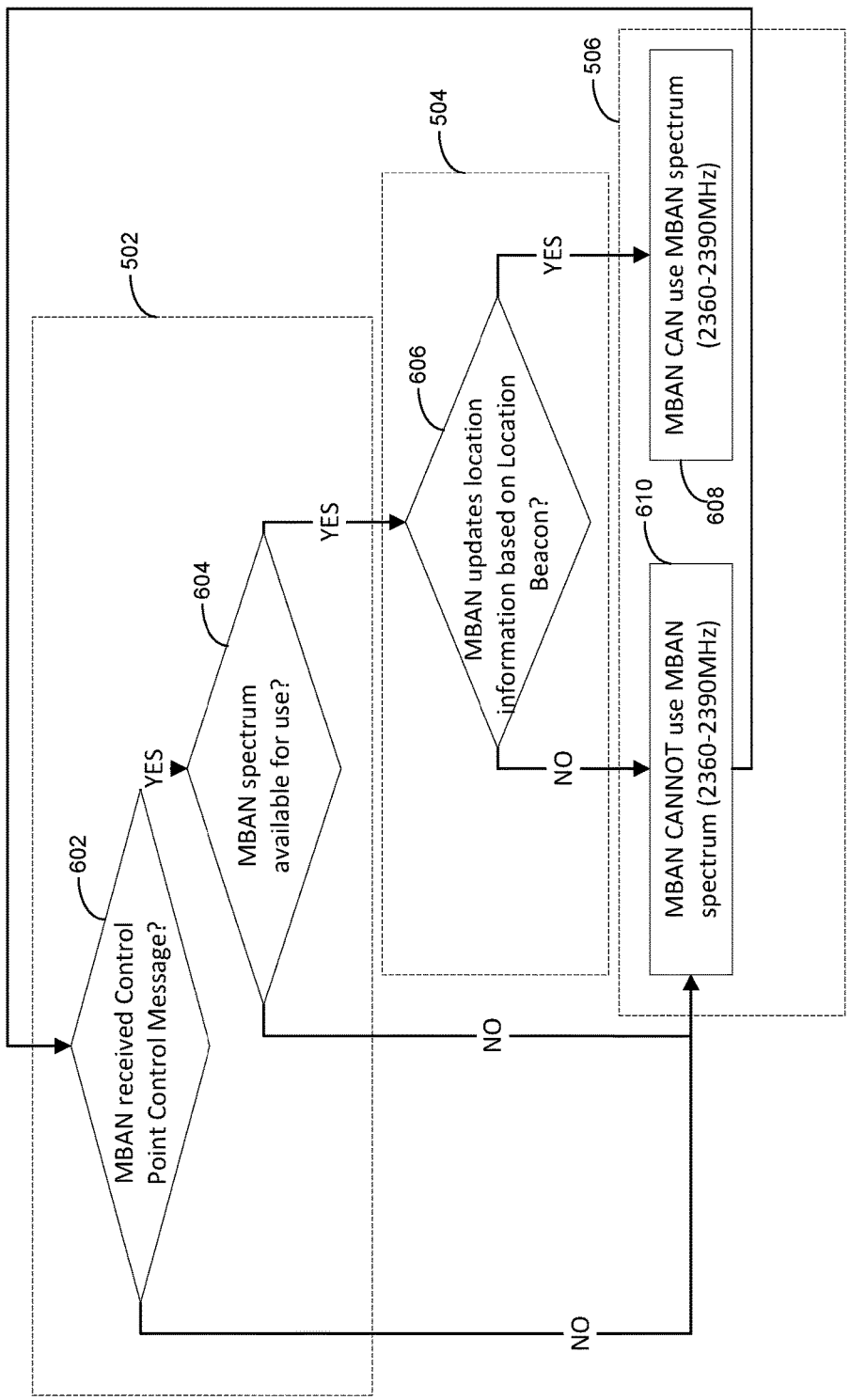

FIG. 6 illustrates an example implementation providing further detail regarding blocks 502, 504, and 506 of the example method 500 of FIG. 5. In the example of FIG. 6, control messages, MBAN spectrum availability, and location beacon information are used to determine allowed usage of the MBAN spectrum. As shown in the example implementation of FIG. 6, at block 602, the MBAN hub 212, 222, 232 evaluates to determine whether it has received a CPCM 272. If a CPCM 272 has been received, then, at block 604, the message 272 is evaluated to determine whether the MBAN spectrum is available for use? For example, the CPCM 272 includes an indication of whether the full MBAN spectrum is available for use, is unavailable, is restricted, etc.

If the full MBAN spectrum (e.g., 2360-2400 MHz) is available for use, then, at block 606, the hub 212, 222, 232 checks signal(s) from one or more nearby beacons 312-318 to determine an updated location. The updated location is evaluated at block 606 to determine whether the hub 212, 22, 232 is inside or outside the hospital. If the hub 212, 222, 232 is inside the hospital, then, at block 608, the MBAN 210, 220, 230 can use the MBAN spectrum (2360-2900 MHz). However, if the hub 212, 222, 232 is outside the hospital (or the MBAN spectrum is not available for use at block 604 or the CPCM 272 is not received at block 602, etc.), then, at block 610, the MBAN 210, 220, 230 cannot use the full MBAN spectrum for communication.

Figure 7:
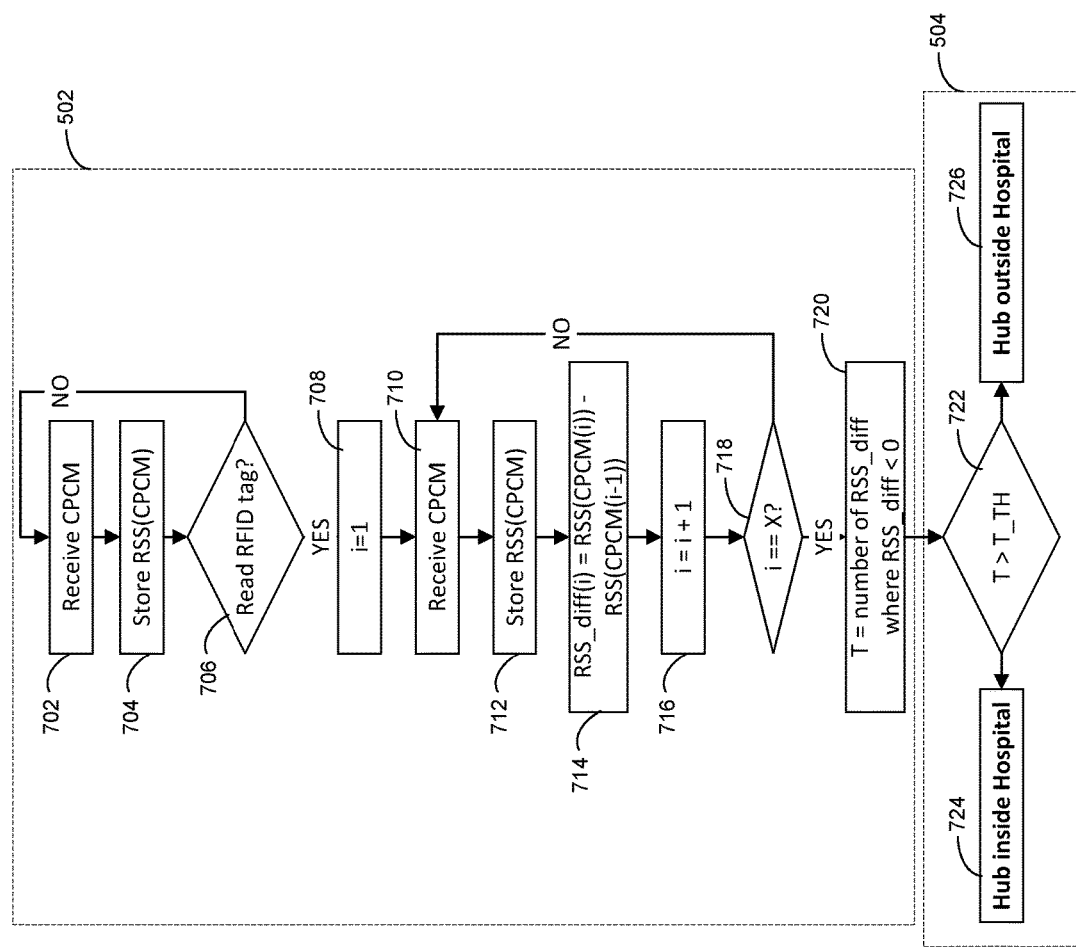

FIG. 7 illustrates another example implementation providing further detail regarding blocks 502, 504 of the example of FIG. 5. In the example of FIG. 7, control messages and beacon information are used to determine allowed usage of the MBAN spectrum. At block 702, the CPCM 272 is received at the MBAN hub 212, 222, 232. For example, the CPCM 272 is received by the hub 212, 222, 232 via the WiFi access point 240. The CPCM 272 indicates whether the MBAN spectrum is available for use or not, for example. If the MBAN spectrum is available, then the hub 212, 222, 232 stores information regarding the control message 272 and looks for a location beacon to determine whether or not the MBAN 210, 222, 232 is 302 or outside 320 the hospital. At block 704, a received signal strength (RSS) associated with the CPCM 272 is stored.

At block 706, the hub 212, 222, 232 looks for an RFID tag within range of the hub 212, 222, 232 to be read. If no RFID tag is within range, then control reverts to block 702 to await another control message. If an RFID is detected, then, at block 708, a message processing loop begins, with a counter, i, set to 1. At block 710, another CPCM 272 is received. At block 712, an RSS associated with the received CPCM 272 is stored at the hub 212, 222, 232.

At block 714, a difference between consecutive CPCM 272 RSS measurements is computed. For example, the prior RSS value is subtracted from the current RSS value. Then, at block 716, the counter, i, is incremented by one. At block 718, the counter is compared to a threshold, X. If the counter, i, is not equal to the threshold, X, then control reverts to block 710 to receive a next control message 272.

However, if the counter has reached the count threshold, then the process advances to block 720, at which the RSS difference values are analyzed. A value, T, represents RSS difference values (e.g., difference between consecutive RSS measurements, etc.) that are less than 0. At block 722, the value, T, is compared to a T threshold. If T is greater than the T threshold, then, at block 724, the hub 212, 222, 232 is determined to be outside the hospital 320. The reduced MBAN spectrum can then be utilized by the hub 212, 222, 232, etc. If T is less than the T threshold, then, at block 726, the hub 212, 222, 232 is determined to be inside the hospital 302. The full MBAN spectrum can then be utilized by the hub 212, 222, 232, etc.

Thus, as described with respect to the example of FIG. 7, the hub 212, 222, 232 can analyze incoming control messages 272 to determine whether or not the full MBAN spectrum is available. If so, the hub 212, 222, 232 compares location information and message signal strength to determine whether or not the hub 212, 222, 232 is inside or outside the hospital. The hub 212, 222, 232 only receives control messages 2727 within the hospital (e.g., APs 240, 242 broadcast the CPCMs 272 within the hospital, etc.), not outside. Reading an RFID on a device indicates that the hub 212, 222, 232 has been moving outside or inside the hospital. Thus, the RFID tag detection is a trigger to evaluate CPCM messages 272 and process a trend of message 272 signal strength. If the RSS is getting weaker, then the hub 212, 222, 232 is moving away from a source of the CPCM messages 272 (e.g., the access point 240, 242, etc.). If the RSS is getting stronger, then the hub 212, 222, 232 is moving toward a source of the CPCM messages 272, for example.

Figure 8:
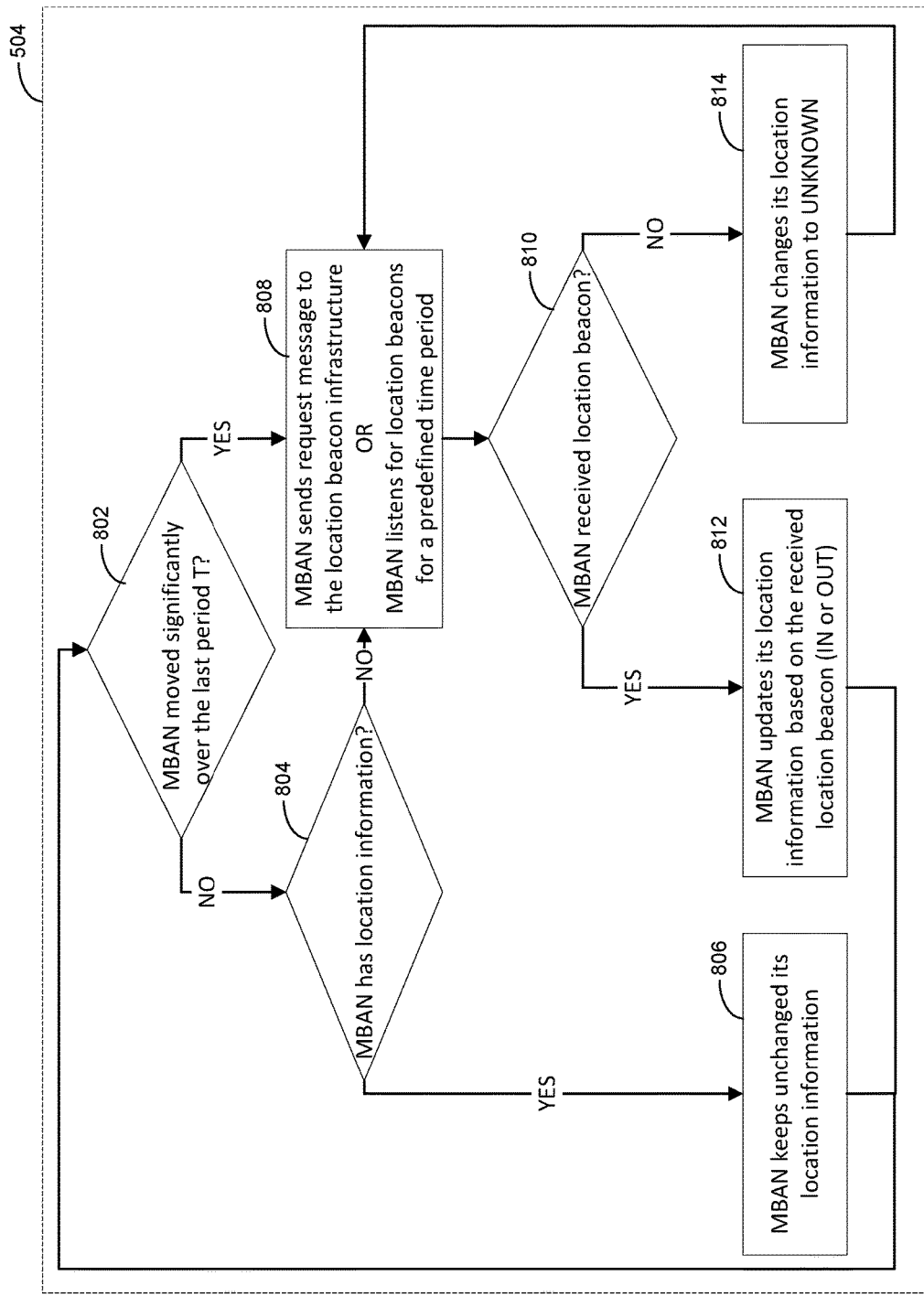

FIG. 8 illustrates another example implementation providing further detail regarding block 504 of the example of FIG. 5. In the example of FIG. 8, MBAN and beacon information are used to determine a location (and/or change in location) of the MBAN 210, 220, 230. As shown in the example of FIG. 8, the MBAN hub 212, 222, 232 can check its location information based on whether the hub 212, 222, 232 detected a change of position (e.g., using accelerometer(s), etc.). If the hub 212, 222, 232 has not moved, the hub 212, 222, 232 can still query location information. If the hub 212, 222, 232 does not have location information, the hub 212, 222, 232 can request location information from the beacon infrastructure 202 and/or wait for a period of time to receive a location message from a location beacon 312-319, for example.

At block 802, the MBAN 210, 220, 230 is evaluated to determine (e.g., using an accelerometer, global positioning system, beacon 312-318 triangulation, etc.) whether the MBAN 210, 220, 230 has moved more than a threshold amount over a period of time, T. For example, an accelerometer in the hub 212, 222, 232 works with the processor 310 to determine whether the hub 212, 222, 232 has moved more than a few feet over the last 5 minutes, etc. As another example, the processor 310 may communicate (e.g., via radio(s) 304, 306, etc.) with a fitness tracker, etc., to determine whether MBAN 210, 220, 230 has moved more than a few feet over the last 10 minutes, etc.

If the MBAN 210, 220, 230 has not moved "significantly" (e.g., more than the threshold distance), then, at block 804, the MBAN 210, 220, 230 (e.g., the MBAN hub 212, 222, 232) determines whether it has location information. For example, has the hub 212, 222, 232 received beacon 312-318 information, CPCM message 272, RFID, and/or other location information. If the MBAN 210, 220, 230 "knows" its location, then, at block 806, the MBAN keeps its location information unchanged.

However, if the MBAN 210, 220, 230 does not have current location information, then, at block 808, the hub 212, 222, 232 sends a request message to the location beacon infrastructure 202. Thus, the hub 212, 222, 232 can broadcast a short message asking for a location response and/or enter a listening mode to listen for a ping from a beacon 312-318 within range of the MBAN 210, 220, 230, for example.

At block 810, the hub 212, 222, 232 evaluates whether the MBAN 210, 220, 230 has received a location beacon in response to the request message, listening mode, etc. If the MBAN hub 212, 222, 232 has received a location beacon, then, at block 812, the hub 212, 222, 232 updates the MBAN 210, 220, 230 location information with information from the location beacon. For example, location can be based on the location beacon alone and/or a combination of multiple location beacons (e.g., to triangulate MBAN 210, 220, 230 location, etc.), taken alone or in combination with a CPCM message 272, etc.

If the MBAN 210, 220, 230 does not receive a location beacon, then, at block 814, the hub 212, 222, 232 changes its location to unknown and reverts to block 808 to send another request message and/or await a beacon 312-318 signal.

Thus, for example, the MBAN 210, 220, 230 may be battery-powered and can conserve power by not always being "on" or active. If the hub 212, 222, 232 were constantly searching for location information, the MBAN 210, 220, 230 would waste power (e.g., because receiving data packets is a power intensive operation, etc.). Using the example process of FIG. 8, the hub 212, 222, 232 can periodically check whether the MBAN 210, 220, 230 has moved and can then undertake a more power-intensive evaluation of current location if the MBAN 210, 220, 230 has moved more than a threshold distance (e.g., enough to likely trigger a meaningful change in location such as inside vs. outside the hospital, etc.).

Figure 9:
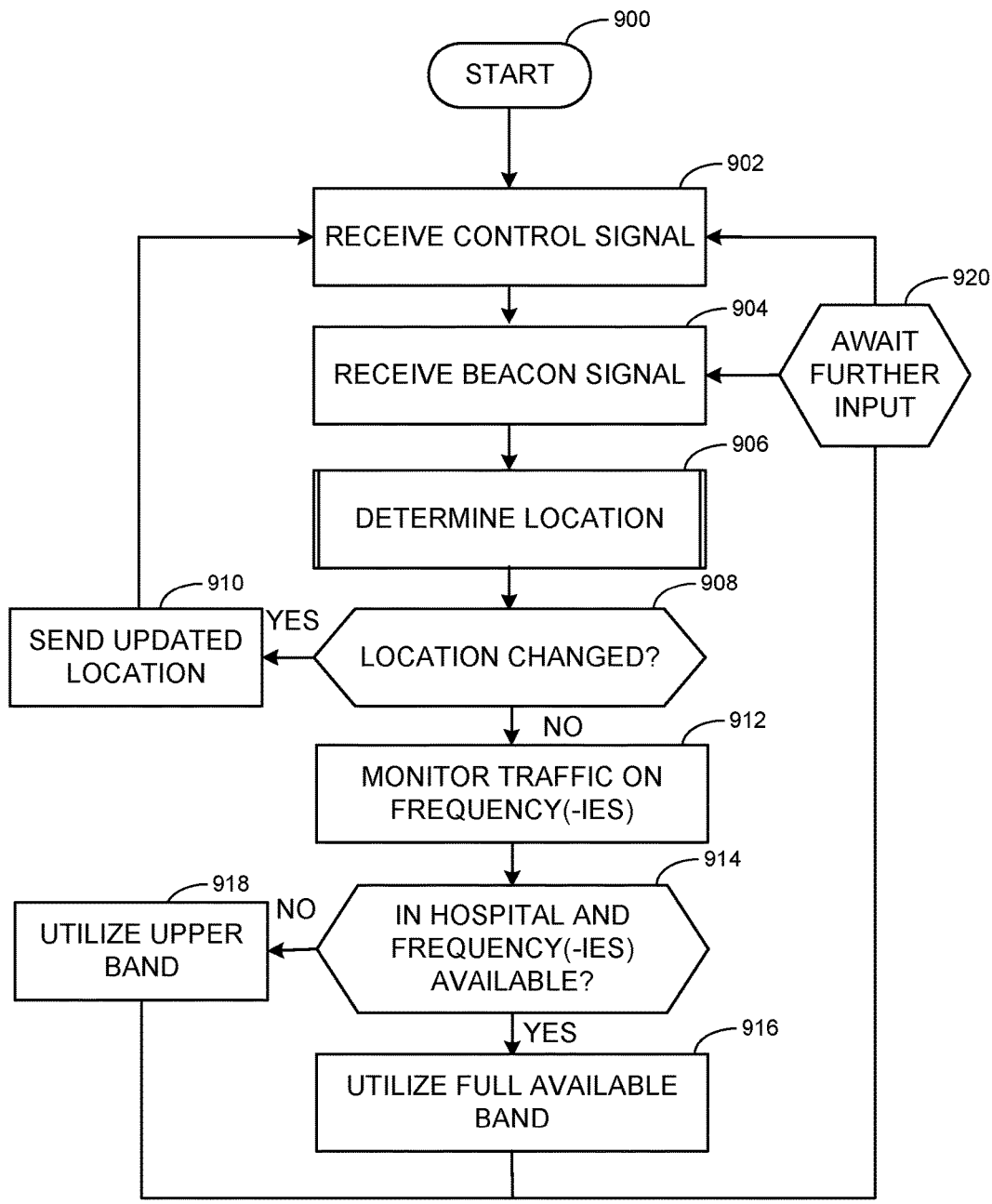

FIG. 9 illustrates a flow diagram of an example method 900 to control frequency band operation of a medical body area network (MBAN). The example method 900 is a particular implementation of the more general process 500 of FIG. 5. At block 902, an MBAN 210, 220, 230 receives a control message 272. The example control message 272 includes an indication of allowed frequency(-ies) for communication by the MBAN 210, 220, 230 and configures the corresponding hub 212, 222, 232 for data communication based on the allowed frequency(-ies), for example.

For example, the MBAN 210, 220, 230 may be configured for communication at a frequency between 2.36-2.4 GHz depending on the location of the MBAN 210, 220, 230 device(s) with respect to a healthcare facility (e.g., inside 302 or outside 320 the healthcare facility, competing device traffic, other communication restriction, etc.). For example, if the MBAN 210, 220, 230 is inside 302 the healthcare facility, the full MBAN frequency range (e.g., 2360-2400 MHz, etc.) can be made available to the MBAN 210, 220, 230 based on the control message 272 sent to the MBAN 210, 220, 230. However, if the control point 262 is aware of conflicting device data traffic and/or the MBAN 210, 220, 230 is located outside 320 the healthcare facility, then the control message 272 can prescribe only the upper portion (e.g., 2390-2400 MHz, etc.) of the frequency spectrum for use by the MBAN 210, 220, 230.

At block 904, a beacon signal is received from a beacon (e.g., beacon 312-316, etc.) by the MBAN 210, 220, 230. For example, as shown in FIG. 3A, the MBAN 210, 220, 230 may be near beacon 312 and/or 314, receiving beacon signals from nearby beacons 312 and/or 314. Alternatively, as shown in the example of FIG. 3B, the MBAN 210, 220, 230 may be near beacon 316 and receiving a signal from that beacon 316. As another alternative, shown in the example of FIG. 3C, the MBAN 210, 220, 230 may be near beacon 318 and receiving a signal from the beacon 318.

At block 906, the MBAN 210, 220, 230 determines its location with respect to the healthcare facility. For example, as shown in FIG. 3A, based on a proximity to beacons 312 and/or 314, the MBAN 210, 220, 230 determines that it is inside 302 the healthcare facility. Similarly, as shown in the example of FIG. 3B, based on a proximity to beacon 316, the MBAN 210, 220, 230 determines that it is inside 302 the healthcare facility. However, as shown in the example of FIG. 3C, based on a proximity to beacon 318, the MBAN 210, 220, 230 determines that it is outside 320 the healthcare facility. In certain examples, proximity to the beacon 312, 314, 316, 318 can be inferred from the signal strength of the received beacon signal. For example, if the received signal strength falls below a certain threshold, then the MBAN 210, 220, 230 assumes that it is out of range of the associated beacon 312, 314, 316, 318. If the MBAN 210, 220, 230 receives or "hears" several beacons 312, 314, 316, 318, then the MBAN 210, 220, 230 can assume its position based on the strongest received beacon signal, for example.

At block 908, the location is evaluated with respect to a prior location determination to identify whether the MBAN 210, 220, 230 has moved. For example, the location proximate to beacons 312 and 314 in the example of FIG. 3A is compared to a prior location determination for the MBAN 210, 220, 230 to determine whether the locations match.

If the location of the MBAN 210, 220, 230 has changed from the prior location determination, then, at block 910, an updated location is sent to the control point 262. Control then reverts to block 902 for a new control message from the control point 262. In some examples, the MBAN 210, 220, 230 can adjust its allocated frequency usage without waiting for a control message 272 from the control point 262.

If the location has not changed (e.g., within a certain range or tolerance of location, etc.), then, at block 912, the MBAN 210, 220, 230 monitors traffic on its configured frequency(-ies). For example, the MBAN hub 212, 222, 232 periodically scans one or more assigned frequency(-ies) to determine whether data traffic from other devices is occupying that frequency band.

At block 914, location, frequency, and/or other input are analyzed to determine whether the MBAN 210, 220, 230 is in the hospital and frequency(-ies) are available to be used. If so, then, at block 916, the MBAN 210, 220, 230 can use the full MBAN spectrum (e.g., 2360-2400 MHz, etc.). If not, then, at block 918, the MBAN 210, 220, 230 is restricted to the upper MBAN frequency spectrum (e.g., 2390-2400 MHz, etc.).

At block 920, the MBAN 210, 220, 230 awaits further input (e.g., a control message, beacon signal, etc.). Control then returns to block 902 to receive another control message 272 from the control point 262 or to block 904 to receive a beacon signal from one or more beacons 312-318.

Figure 10:
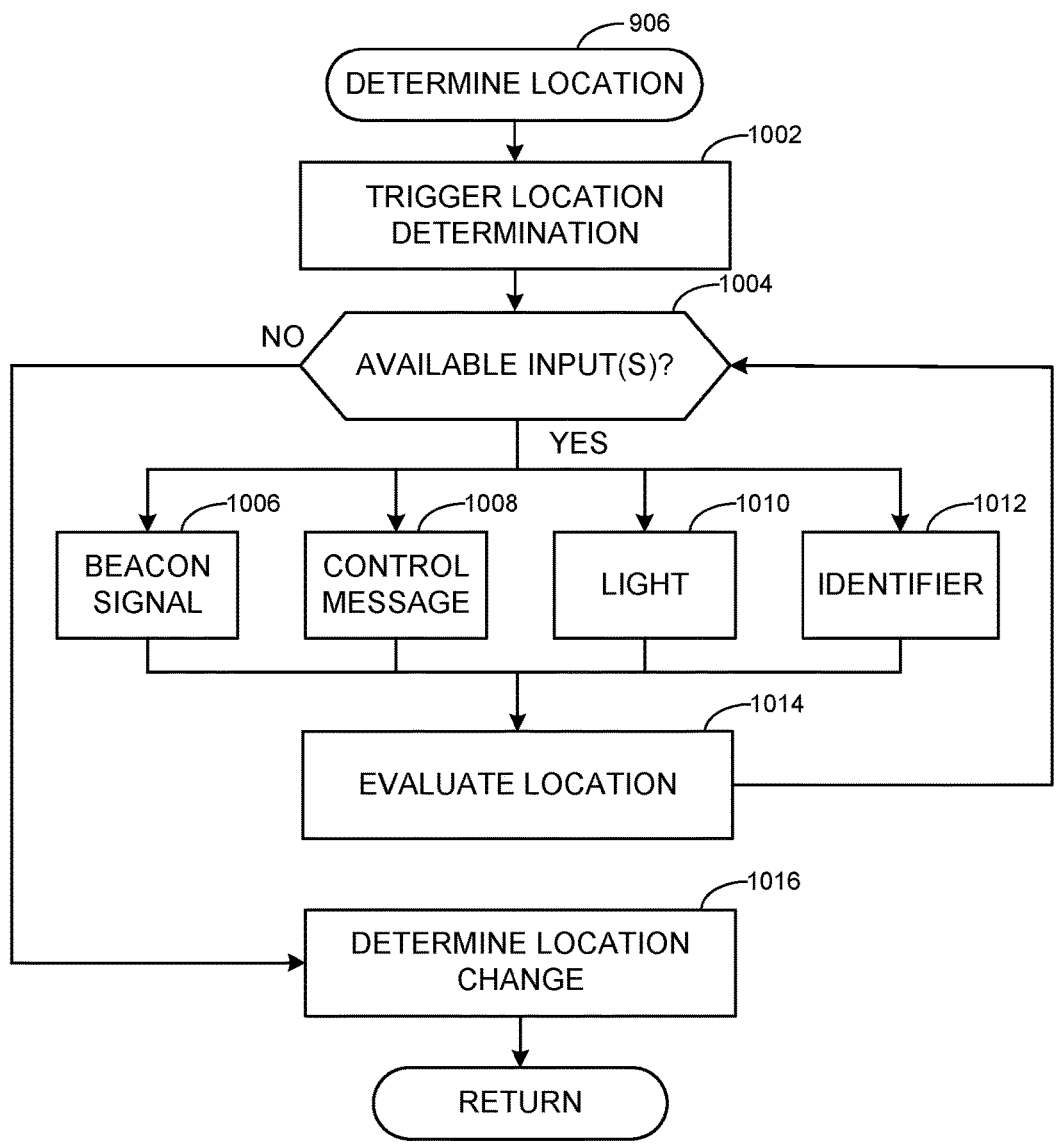

FIG. 10 illustrates a flow diagram providing further example detail regarding location determination at block 906 in the flow diagram 900 of the example of FIG. 9. In the example of FIG. 10, at block 1002, a location determination is triggered. For example, the hub 212 receives a control message 272 from the control point 262, an accelerometer on the hub 212 and/or connected to the hub 212 detects movement, and/or other stimulus at the hub 212 initiates the location determination.

At block 1004, one or more available input(s) are analyzed. For example, at block 1006, a beacon signal is received from one or more beacons 312-318 can be received with an associated identification, signal strength, etc. As another example, at block 1008, a control message 272 can be periodically sent to the hub 212 with location information, associated signal strength, etc. At block 1010, light and/or other visual information can be detected by the hub 212 (e.g., using the camera 308, etc.). A certain intensity, modulation, etc., of light can inform the hub 212 regarding its location (e.g., inside the hospital 302, outside the hospital 320, etc.). At block 1012, an identifier (e.g., an access point SSID, etc.) can be received and used by the hub 212 (e.g., via the wireless radio 306, etc.) to identify the AP 240, 242 and its associated signal strength, etc.

At block 1014, the location of the hub 212 (and its MBAN) is evaluated. For example, based on the beacon signal 1006, control message 1008, light 1010, and/or identifier 1012, the hub 212 (e.g., using its processor 310, etc.) determines its location (e.g., inside 302 the hospital, outside 320 the hospital, in a certain hospital department, near an entrance/exit, entering/leaving, etc.). For example, an identifier and/or associated signal strength in the beacon signal, control message 272, SSID, etc., can be used by the processor 310 of the hub 212 to evaluate location such as based on beacon 312-318 relationships, prior information regarding beacon 312-318 and/or other asset (e.g., RFID, etc.) positioning, etc. For example, the hub 212 may know that beacons 312 and 314 are well within the hospital, while beacon 316 is near the door and beacon 318 is outside. An identification of the beacon 312-318 provides a beacon location, and an RSSI of the received signal allows the hub 212 to determine the proximity of the MBAN 210, 220, 230 to that beacon location, for example.

If other input(s) (block 1004) remain to be analyzed, the hub 212 further evaluates its location (block 1014) based on a combination of beacon signal 1006, control message 1008, light 1010, and/or identifier 1012, for example. Thus, at block 1014, the hub 212 can evaluate a plurality of factors (e.g., light in combination with beacon signal, control message in combination with RFID, control message signal strength in combination with beacon identifier, etc.) for a more accurate and/or more precise determination of MBAN 210, 220, 230 location with respect to the healthcare facility.

When no input remains to be processed (block 1004), at block 1016, a change in location is determined. For example, the determined location (block 1014) is compared to a prior (e.g., previously determined) location for the MBAN 210, 220, 230 to determine whether the locations match or are different. For example, locations can be compared based on proximity to certain beacon(s) 312-318 (e.g., based on identification and signal strength, combination of multiple IDs, etc.), receipt of certain message(s) and/or identifier(s), measurement of certain light frequency and/or intensity, etc., to compare the two location determinations. Location comparison can be made with a certain tolerance, margin for error, standard deviation, etc., such that an approximate location match is treated as the same location (e.g., if the MBAN 210, 220, 230 has moved a few feet, stayed within the same department, is still between the same beacons 312, 314, etc., the MBAN 210, 220, 230 is considered to be in the same location (e.g., the location determinations match)). A match or change in location can be provided to block 908. Control reverts to block 908 to act on the evaluation of whether or not the MBAN location has changed.

Thus, certain examples provide improved, automated, dynamic frequency switching for MBAN operation in and out of a healthcare facility. Certain examples provide technologically improved operation to help maximize or otherwise improve usage of available bandwidth for MBAN devices while also reducing or minimizing conflicts with other medical devices using overlapping frequency(-ies) range(s). Certain examples provide a technological benefit in medical device monitoring and communications by improving performance of a wireless ambulatory monitoring system by allowing for more intelligent and proactive frequency band selection and hopping.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Figure 11:
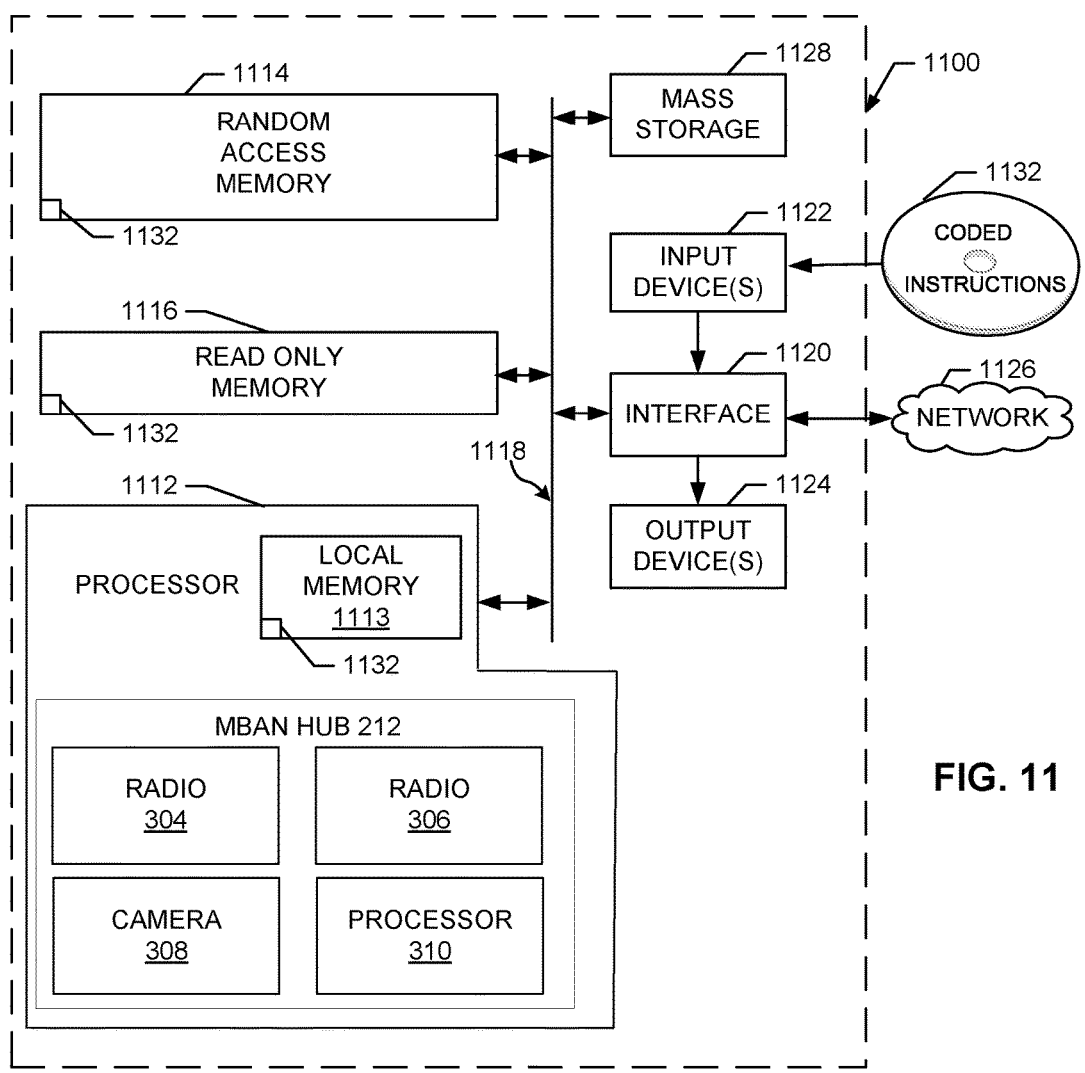
FIGS. 11-12 are block diagrams of an example processor platforms that can execute instructions to implement the example systems and methods of FIGS. 1-10.

FIG. 11 is a block diagram of an example processor platform 1100 that can execute instructions to implement the example systems and methods of FIGS. 1-10. The processor platform 1100 can be, for example, a server, a personal computer, a mobile device (e.g., a cell phone, a smart phone, a tablet such as an IPAD™), a personal digital assistant (PDA), an Internet appliance, or any other type of computing device.

The processor platform 1100 of the illustrated example includes a processor 1112. Processor 1112 of the illustrated example is hardware. For example, processor 1112 can be implemented by one or more integrated circuits, logic circuits, microprocessors or controllers from any desired family or manufacturer.

Processor 1112 of the illustrated example includes a local memory 1113 (e.g., a cache). Processor 1112 of the illustrated example is in communication with a main memory including a volatile memory 1114 and a non-volatile memory 1116 via a bus 1118. Volatile memory 1114 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 can be implemented by flash memory and/or any other desired type of memory device. Access to main memory 1114, 1116 is controlled by a memory controller. The processor 1112, alone or in conjunction with the memory 1113, can be used to implement the MBAN hub 212 including its radios 304, 306, camera 308, processor 310, and/or other part of the systems disclosed herein.

Processor platform 1100 of the illustrated example also includes an interface circuit 1120. Interface circuit 1120 can be implemented by any type of interface standard, such as an Ethernet interface, a universal serial bus (USB), and/or a PCI express interface.

In the illustrated example, one or more input devices 1122 are connected to the interface circuit 1120. Input device(s) 1122 permit(s) a user to enter data and commands into processor 1112. The input device(s) 1122 can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to interface circuit 1120 of the illustrated example. Output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). Interface circuit 1120 of the illustrated example, thus, typically includes a graphics driver card, a graphics driver chip or a graphics driver processor.

Interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

Processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 associated with any of FIGS. 1-10 can be stored in mass storage device 1128, in volatile memory 1114, in the non-volatile memory 1116, and/or on a removable tangible computer readable storage medium such as a CD or DVD.

It may be noted that operations performed by the processor platform 1100 (e.g., operations corresponding to process flows or methods discussed herein, or aspects thereof) may be sufficiently complex that the operations may not be performed by a human being within a reasonable time period.

Figure 12:
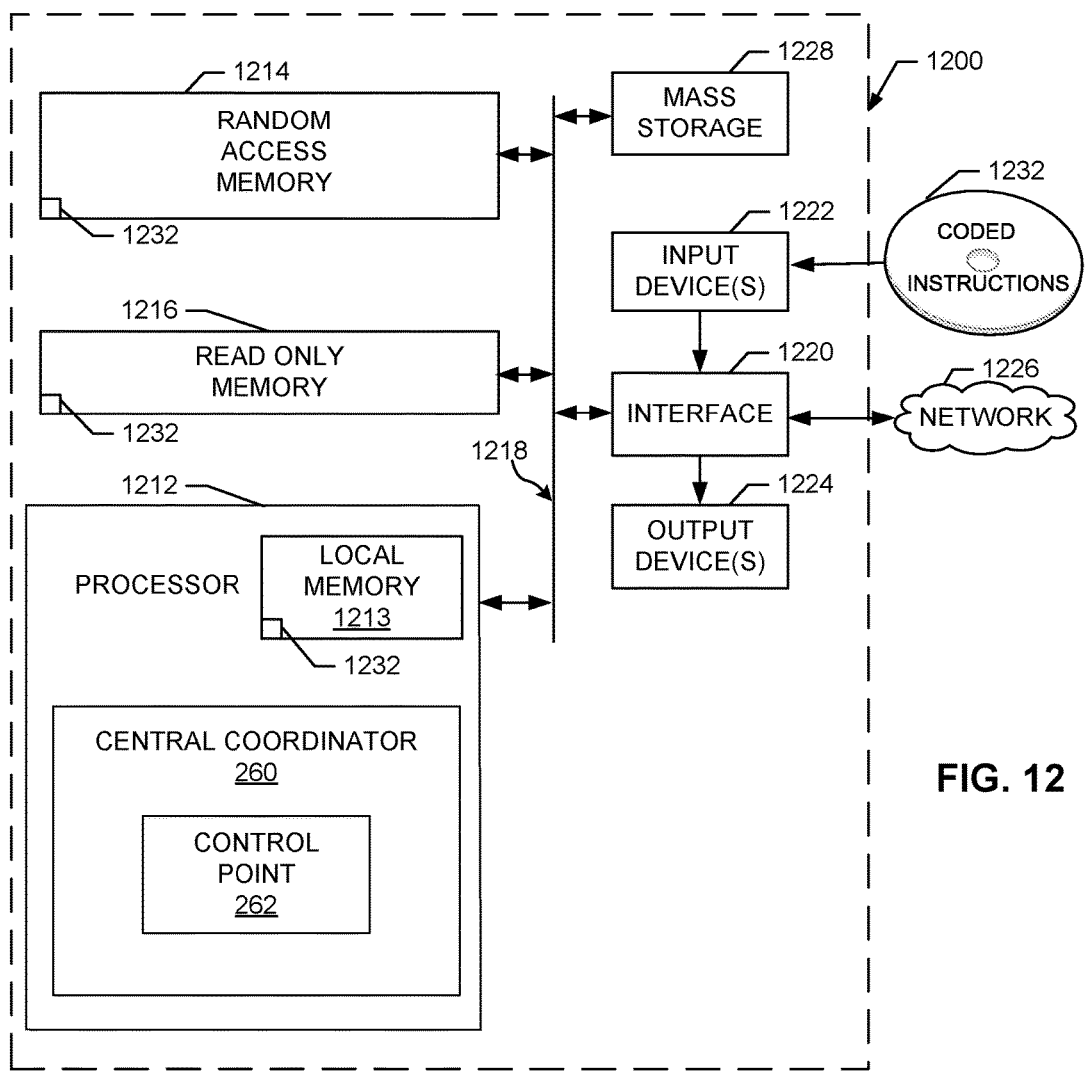

FIG. 12 is a block diagram of an example processor platform 1200 that can execute instructions to implement the example systems and methods of FIGS. 1-10. The processor platform 1200 can be, for example, a server, a personal computer, a mobile device (e.g., a cell phone, a smart phone, a tablet such as an IPAD™), a personal digital assistant (PDA), an Internet appliance, or any other type of computing device.

The processor platform 1200 of the illustrated example includes a processor 1212. Processor 1212 of the illustrated example is hardware. For example, processor 1212 can be implemented by one or more integrated circuits, logic circuits, microprocessors or controllers from any desired family or manufacturer.

Processor 1212 of the illustrated example includes a local memory 1213 (e.g., a cache). Processor 1212 of the illustrated example is in communication with a main memory including a volatile memory 1214 and a non-volatile memory 1216 via a bus 1218. Volatile memory 1214 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 can be implemented by flash memory and/or any other desired type of memory device. Access to main memory 1214, 1216 is controlled by a memory controller. The processor 1212, alone or in conjunction with the memory 1213, can be used to implement the central coordinator 260, control point 262, and/or other part of the systems disclosed herein.

Processor platform 1200 of the illustrated example also includes an interface circuit 1220. Interface circuit 1220 can be implemented by any type of interface standard, such as an Ethernet interface, a universal serial bus (USB), and/or a PCI express interface.

In the illustrated example, one or more input devices 1222 are connected to the interface circuit 1220. Input device(s) 1222 permit(s) a user to enter data and commands into processor 1212. The input device(s) 1222 can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to interface circuit 1220 of the illustrated example. Output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). Interface circuit 1220 of the illustrated example, thus, typically includes a graphics driver card, a graphics driver chip or a graphics driver processor.

Interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

Processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 associated with any of FIGS. 1-10 can be stored in mass storage device 1228, in volatile memory 1214, in the non-volatile memory 1216, and/or on a removable tangible computer readable storage medium such as a CD or DVD.

It may be noted that operations performed by the processor platform 1200 (e.g., operations corresponding to process flows or methods discussed herein, or aspects thereof) may be sufficiently complex that the operations may not be performed by a human being within a reasonable time period.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A medical body area network apparatus to transmit and receive patient-related data from at least one wearable monitoring device, the apparatus comprising:
   a radio to receive a beacon signal; and
   a processor to process the beacon signal to determine a location of the apparatus with respect to a healthcare facility, the processor configured to at least:
   when the beacon signal indicates a first location inside the healthcare facility, configure at least one device in the medical body area network apparatus to communicate via a first frequency band; and when the beacon signal indicates a second location outside the healthcare facility, configure at least one device in the medical body area network apparatus to communicate via a second frequency band, wherein the first frequency band includes the second frequency band.

2. The apparatus of claim 1, wherein the processor is to process the beacon signal to determine the location of the apparatus based on at least one of a signal strength associated with the beacon signal or an identifier in the beacon signal.

3. The apparatus of claim 2, wherein the processor is to identify a transition between first and second beacons based on first and second received beacon signals.

4. The apparatus of claim 1, wherein the processor is to further determine the location of the apparatus based on at least one of a control message or a light intensity.

5. The apparatus of claim 1, wherein the medical body area network apparatus includes a) a hub including the processor and the radio and b) at least one sensor to monitor a parameter associated with a person.

6. The apparatus of claim 1, wherein the processor is to notify a control point of a change in location via the radio.

7. The apparatus of claim 6, wherein the processor is to receive and process a configuration message from the control point in response to the change in location.

8. A non-transitory computer readable storage medium including instructions which, when executed, cause a processor to at least implement a method to control a medical body area network device to transmit and receive patient-related data from at least one wearable monitoring device by at least:

processing a beacon signal to determine a location of the medical body area network device with respect to a healthcare facility;

when the beacon signal indicates a first location inside the healthcare facility, configuring at least one wearable monitoring device in the medical body area network device to communicate via a first frequency band; and when the beacon signal indicates a second location outside the healthcare facility, configuring at least one wearable monitoring device in the medical body area network device to communicate via a second frequency band, wherein the first frequency band includes the second frequency band.

9. The computer readable storage medium of claim 8, wherein the instructions, when executed, further configure the processor to process the beacon signal to determine the location of the device based on at least one of a signal strength associated with the beacon signal or an identifier in the beacon signal.

10. The computer readable storage medium of claim 9, wherein the instructions, when executed, further configure the processor identify a transition between first and second beacons based on first and second received beacon signals.

11. The computer readable storage medium of claim 8, wherein the instructions, when executed, further configure the processor to further determine the location of the device based on at least one of a control message or a light intensity.

12. The computer readable storage medium of claim 8, wherein the instructions, when executed, further configure the processor to notify a control point of a change in location via the radio.

13. The computer readable storage medium of claim 12, wherein the instructions, when executed, further configure the processor receive and process a configuration message from the control point in response to the change in location.

14. A method to control a medical body area network device to transmit and receive patient-related data from at least one wearable monitoring device, the method comprising:

processing, using a processor, a beacon signal to determine a location of the medical body area network device with respect to a healthcare facility;

when the beacon signal indicates a first location inside the healthcare facility, configuring at least one wearable monitoring device in the medical body area network device to communicate via a first frequency band; and when the beacon signal indicates a second location outside the healthcare facility, configuring at least one wearable monitoring device in the medical body area network device to communicate via a second frequency band, wherein the first frequency band includes the second frequency band.

15. The method of claim 14, further including processing the beacon signal to determine the location of the apparatus based on at least one of a signal strength associated with the beacon signal or an identifier in the beacon signal.

16. The method of claim 15, wherein the processor is to identify a transition between first and second beacons based on first and second received beacon signals.

17. The method of claim 14, further including determining the location of the apparatus based on at least one of a control message or a light intensity.

* * * * *